United States Patent
Pao et al.

(10) Patent No.: US 10,237,791 B2
(45) Date of Patent: Mar. 19, 2019

(54) METHOD OF UPDATING NETWORK DETECTION AND SELECTION INFORMATION AND TRAFFIC ROUTING INFORMATION

(71) Applicant: ACER INCORPORATED, New Taipei (TW)

(72) Inventors: Wei-Chen Pao, New Taipei (TW); Ching-Wen Cheng, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 184 days.

(21) Appl. No.: 14/669,005

(22) Filed: Mar. 26, 2015

(65) Prior Publication Data
US 2015/0282021 A1    Oct. 1, 2015

Related U.S. Application Data

(60) Provisional application No. 61/970,914, filed on Mar. 27, 2014.

(51) Int. Cl.
| *H04W 36/00* | (2009.01) |
| *H04W 48/16* | (2009.01) |
| *H04W 8/18* | (2009.01) |
| *H04W 48/18* | (2009.01) |

(52) U.S. Cl.
CPC ... *H04W 36/0083* (2013.01); *H04W 36/0066* (2013.01); *H04W 48/16* (2013.01); *H04W 8/18* (2013.01); *H04W 48/18* (2013.01)

(58) Field of Classification Search
None
See application file for complete search history.

(56) References Cited

U.S. PATENT DOCUMENTS

| 2010/0003980 A1 | 1/2010 | Rune |
| 2011/0002306 A1* | 1/2011 | Liu .................... H04W 36/0033 370/331 |
| 2012/0057568 A1* | 3/2012 | Lim ...................... H04W 4/22 370/331 |
| 2012/0071165 A1 | 3/2012 | Pampu |
| 2013/0252641 A1* | 9/2013 | Pampu ................ H04W 36/385 455/456.5 |

(Continued)

FOREIGN PATENT DOCUMENTS

| CN | 102257853 A | 11/2011 |
| CN | 102869069 A | 1/2013 |

(Continued)

OTHER PUBLICATIONS

Broadcom Corporation, Dedicated Signaling to carry WLAN interworking Policy's assistance Information, 3GPP TSG-RAN WG2 Meeting #83, Aug. 19-23, 2013, R2-132797, Barcelona, Spain.

(Continued)

*Primary Examiner* — Kodzovi Acolatse
(74) *Attorney, Agent, or Firm* — Winston Hsu

(57) ABSTRACT

A method of updating network detection and selection information and traffic routing information for a communication device in a wireless communication system is disclosed. The method comprises updating network detection and selection information and traffic routing information by an access stratum procedure, handover procedure, area update procedure, attach procedure, or cell selection or reselection procedure.

15 Claims, 42 Drawing Sheets

(56) References Cited

U.S. PATENT DOCUMENTS

| | | | | |
|---|---|---|---|---|
| 2013/0324123 A1* | 12/2013 | Ianev | ................... | H04W 4/005 455/435.1 |
| 2015/0038142 A1* | 2/2015 | Wang | ................... | H04W 48/12 455/436 |
| 2015/0092553 A1* | 4/2015 | Sirotkin | ................ | H04W 48/16 370/235 |
| 2015/0271729 A1* | 9/2015 | Sirotkin | ................ | H04W 48/00 370/332 |
| 2015/0282082 A1* | 10/2015 | Landais | ............ | H04W 52/0222 370/311 |
| 2015/0304898 A1* | 10/2015 | Faccin | .............. | H04W 28/0289 370/235 |
| 2016/0007268 A1* | 1/2016 | Jung | ..................... | H04W 48/08 370/338 |

FOREIGN PATENT DOCUMENTS

| | | |
|---|---|---|
| JP | 2013225770 A | 10/2013 |
| WO | 2010105435 A1 | 9/2010 |
| WO | 2012109272 A1 | 8/2012 |

OTHER PUBLICATIONS

Motorola Mobility, Assumptions and Requirements for ANDSF Rules with RAN Thresholds, SA WG2 Meeting #102, S2-141077, Mar. 24-28, 2014, St. Julian's, Malta.

Renesas Mobile Europe Ltd, RAN assistance on ANDSF information provisioning, 3GPP TSG-RAN WG2 Meeting #83bis, Oct. 7-Oct. 11, 2013, R2-133340, XP050718996, Ljubljana, Slovenia.

Alcatel-Lucent et al., Interaction between ANDSF policies and RAN rules, SA WG2 Meeting #102, Mar. 24-28, 2014, S2-141105, XP050804589, St. Julian's, Malta.

Nokia Siemens Networks et al., On WLAN/3GPP Radio Interworking in the context of ANDSF, 3GPP TSG-RAN WG2 Meeting #81bis, Apr. 15-19, 2013, R2-131144, XP050699264, Chicago, USA.

3rd Generation Partnership Project; Technical Specification Group Core Network and Terminals; Access to the 3GPP Evolved Packet Core (EPC) via non-3GPP access networks; Stage 3, 3GPP TS 24.302 V12.4.0 Technical Specification, Mar. 2014, pp. 1-87, Release 12, XP050769822, 3GPP Organizational Partners.

* cited by examiner

|  | Parameter1 |  |  | Parameter2 |  |  | Parameter3 |  |  | Parameter4 |  |  |
|---|---|---|---|---|---|---|---|---|---|---|---|---|
| RAI Set1 | 1 | 1 | 0 | RAI Set5 | 0 | 0 | 1 | RAI Set9 | 1 | 0 | 1 | RAI Set13 | 0 | 0 | 1 |
| RAI Set2 | 1 | 1 | 0 | 1 | RAI Set6 | 0 | 1 | 0 | RAI Set10 | 1 | 0 | 1 | 0 | RAI Set14 | 0 | 0 | 1 | 0 |
| RAI Set3 | 1 | 0 | 1 | 1 | RAI Set7 | 0 | 1 | 1 | 0 | RAI Set11 | 1 | 1 | 0 | 0 | RAI Set15 | 0 | 1 | 0 | 0 |
| RAI Set4 | 0 | 1 | 1 | 1 | RAI Set8 | 0 | 1 | 0 | 0 | RAI Set12 | 1 | 1 | 0 | 1 | RAI Set16 | 0 | 0 | 0 | 0 |

FIG. 29

| Parameter1 | | | | Parameter2 | | | | Parameter3 | | | | Parameter4 | | | |
|---|---|---|---|---|---|---|---|---|---|---|---|---|---|---|---|
| 1 | 1 | 1 | 0 | 0 | 0 | 0 | 1 | 1 | 1 | 0 | 1 | 0 | 0 | 0 | 1 |
| 1 | 1 | 0 | 1 | 0 | 0 | 1 | 1 | 1 | 1 | 1 | 0 | 0 | 0 | 1 | 0 |
| 1 | 0 | 1 | 1 | 0 | 0 | 1 | 0 | 1 | 1 | 1 | 0 | 1 | 1 | 0 | 0 |
| 0 | 1 | 1 | 1 | 0 | 0 | 1 | 0 | 1 | 1 | 1 | 1 | 0 | 0 | 0 | 0 |

| RAN Rule1 | | | RAN Rule2 | | | RAN Rule3 | | | RAN Rule4 | | |
|---|---|---|---|---|---|---|---|---|---|---|---|
| RR Set1 | 1 | 1 | 0 | RR Set5 | 0 | 1 | 1 | RR Set9 | 1 | 0 | 0 | RR Set13 | 0 | 0 | 1 |
| RR Set2 | 1 | 1 | 0 | 1 | RR Set6 | 0 | 1 | 0 | 1 | RR Set10 | 1 | 1 | 0 | RR Set14 | 0 | 0 | 0 |
| RR Set3 | 1 | 0 | 1 | RR Set7 | 0 | 1 | 1 | 0 | RR Set11 | 1 | 1 | 0 | RR Set15 | 1 | 0 | 0 |
| RR Set4 | 0 | 1 | 1 | RR Set8 | 0 | 1 | 0 | 0 | RR Set12 | 1 | 1 | 1 | RR Set16 | 0 | 0 | 0 |

| RAN Rule1 | RAN Rule2 | RAN Rule3 | RAN Rule4 |
|---|---|---|---|
| 1 1 1 0 | 0 0 1 1 | 1 1 0 1 | 0 0 0 1 |
| 1 1 0 1 | 0 1 0 1 | 1 0 1 0 | 0 0 1 0 |
| 1 0 1 1 | 0 1 1 0 | 1 0 1 0 | 1 0 0 0 |
| 0 1 1 1 | 0 1 0 0 | 1 1 1 1 | 0 0 0 0 |

| Parameter1 | | Parameter2 | | RAN Rule1 | | RAN Rule2 | |
|---|---|---|---|---|---|---|---|
| RnR Set1 | 1 1 | RnR Set5 | 1 1 | RnR Set9 | 0 1 1 | RnR Set13 | 0 0 1 |
| RnR Set2 | 1 0 | RnR Set6 | 1 0 | RnR Set10 | 0 1 0 | RnR Set14 | 0 0 0 |
| RnR Set3 | 1 1 | RnR Set7 | 1 0 | RnR Set11 | 0 1 1 | RnR Set15 | 0 0 1 |
| RnR Set4 | 1 0 | RnR Set8 | 1 0 | RnR Set12 | 0 1 0 | RnR Set16 | 0 0 0 |

FIG. 35

| Parameter1 | | | | Parameter2 | | | | RAN Rule1 | | | | RAN Rule2 | | | |
|---|---|---|---|---|---|---|---|---|---|---|---|---|---|---|---|
| 1 | 1 | 1 | 1 | 1 | 0 | 1 | 1 | 0 | 1 | 1 | 1 | 0 | 0 | 1 | 1 |
| 1 | 1 | 1 | 0 | 1 | 0 | 1 | 0 | 0 | 1 | 1 | 0 | 0 | 0 | 1 | 0 |
| 1 | 1 | 0 | 1 | 1 | 0 | 0 | 1 | 0 | 1 | 0 | 1 | 0 | 0 | 0 | 1 |
| 1 | 1 | 0 | 0 | 1 | 0 | 0 | 0 | 0 | 1 | 0 | 0 | 0 | 0 | 0 | 0 |

METHOD OF UPDATING NETWORK DETECTION AND SELECTION INFORMATION AND TRAFFIC ROUTING INFORMATION

CROSS REFERENCE TO RELATED APPLICATIONS

This application claims the benefit of U.S. Provisional Application No. 61/970,914, filed on Mar. 27, 2014 and entitled "Apparatuses, Systems, and Methods for Updating Network Detection and Selection Information", the contents of which are incorporated herein in their entirety.

BACKGROUND OF THE INVENTION

1. Field of the Invention

The present invention relates to a method used in a communication device in a wireless communication system, and more particularly, to a method of updating network detection and selection information and traffic routing information.

2. Description of the Prior Art

3GPP in Release 11 proposes Access Network Discovery and Selection Function (ANDSF) Management Object (MO) to manage Inter-System Mobility Policy (ISMP) and Inter-System. Routing Policy (ISRP) as well as access network discovery information stored in a user equipment (UE) supporting provisioning of such information from an ANDSF, which is a network element providing access network (e.g. WLAN) discovery and selection assistance data as per operators' policy. In a word, ANDSF provides information containing network detection and selection information and traffic routing information to assist the UE with selecting the access network or the inter-system mobility policy to control and assist the UE with performing the inter-system change or to assist the UE with determining how to route IP traffics or all of the above mentioned. This information also contains ISMP, which prioritizes the access network when the UE is not capable to connect to the EPC through multiple accesses, and ISRP, which indicates how to distribute traffic among available accesses when the UE is capable to connect to the EPC through multiple accesses while access network discovery and selection information provides further information for the UE to access the access network defined in the ISMP or in the ISRP or in the access network discovery information.

Please refer to FIG. 1, which illustrates ANDSF operation according to the prior art. The ANDSF of Public Land Mobile Network (PLMN) sends ANDSF MO indicating a preferred Service Set Identifier (SSID) for identifying a WLAN or a priority of SSIDs, to the UE. The UE determines whether to use a WLAN according to the information (i.e. SSID) obtained from the ANDSF MO kept in the UE. For example, when the UE moves into the service coverage of a WLAN, the UE could be aware of the existing of the WLAN by a SSID broadcasted by the WLAN AP (Access Point). If the broadcasted SSID is the SSID indicated in the ANDSF MO, the UE selects the WLAN. Note that, ANDSF rules (including ISRP/ISMP) may be provided to the UE via the ANDSF MO or pre-configured at the UE.

Please refer to FIG. 2, which illustrates ANDSF rules supporting RAN assistance information. The eNB provides RAN assistance information to the UE, wherein the RAN assistance information includes parameters and/or values, such as threshRsrpLow=−90 dBm, threshRsrpHigh=−80 dbm, threshRsrqLow=3 dB, threshRsrqHigh=4 dB, etc. The UE applies the parameters as well as the values associated to specific parameters of RAN assistance information to ANDSF rules (including IARP rule, ISMP rule, ISRP rule, etc) obtained via the ANDSF MO or via existing OMA-DM mechanisms or pre-configured at the UE. In a word, when the UE receives RAN assistance information, this information is taken into account for evaluating the provisioned ANDSF rules.

However, RAN assistance information could be different or out-of-date when the UE changes serving RAN access node (e.g. a serving eNB). In addition, RAN rules could be different when the device changes serving PLMN or serving RAN access node. In detail, please refer to FIG. 3, which illustrates that the UE supporting ANDSF operation moves from the source cell to the target cell. In case the source cell and the target cell belong to different PLMNs, the mobility of the UE may also bring out the change of PLMN. Therefore, the applicant notices that a mechanism is needed to provide and to update RAN rules and RAN assistance information to the UE.

In addition, RAN assistance information could be updated frequently to reflect the RAN condition, or RAN rules should be update to the UE efficiently for better user experience and load balancing. However, RAN assistance information or RAN rules update could be cumbersome so that the delivery of RAN assistance information or RAN rules could consume a lot of radio resource. Therefore, the applicant believes a mechanism is needed to provide reduced amount of data sent from access node to the UE.

SUMMARY OF THE INVENTION

It is therefore an objective to provide a method of updating network detection and selection information and traffic routing information to solve the above problem.

The present invention discloses a method of updating network detection and selection information and traffic routing information for a communication device in a wireless communication system. The method comprises updating network detection and selection information and traffic routing information by an access stratum procedure, handover procedure, area update procedure, attach procedure, or cell selection or reselection procedure.

The present invention discloses a method of updating network detection and selection information and traffic routing information for a network in a wireless communication system. The method comprises updating network detection and selection information and traffic routing information by an access stratum procedure, a handover procedure, an area update procedure, an attach procedure, or cell selection or reselection procedure.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 29-37 illustrate the configurations of RAN info according to the present disclosure.

DETAILED DESCRIPTION

Figure 4:
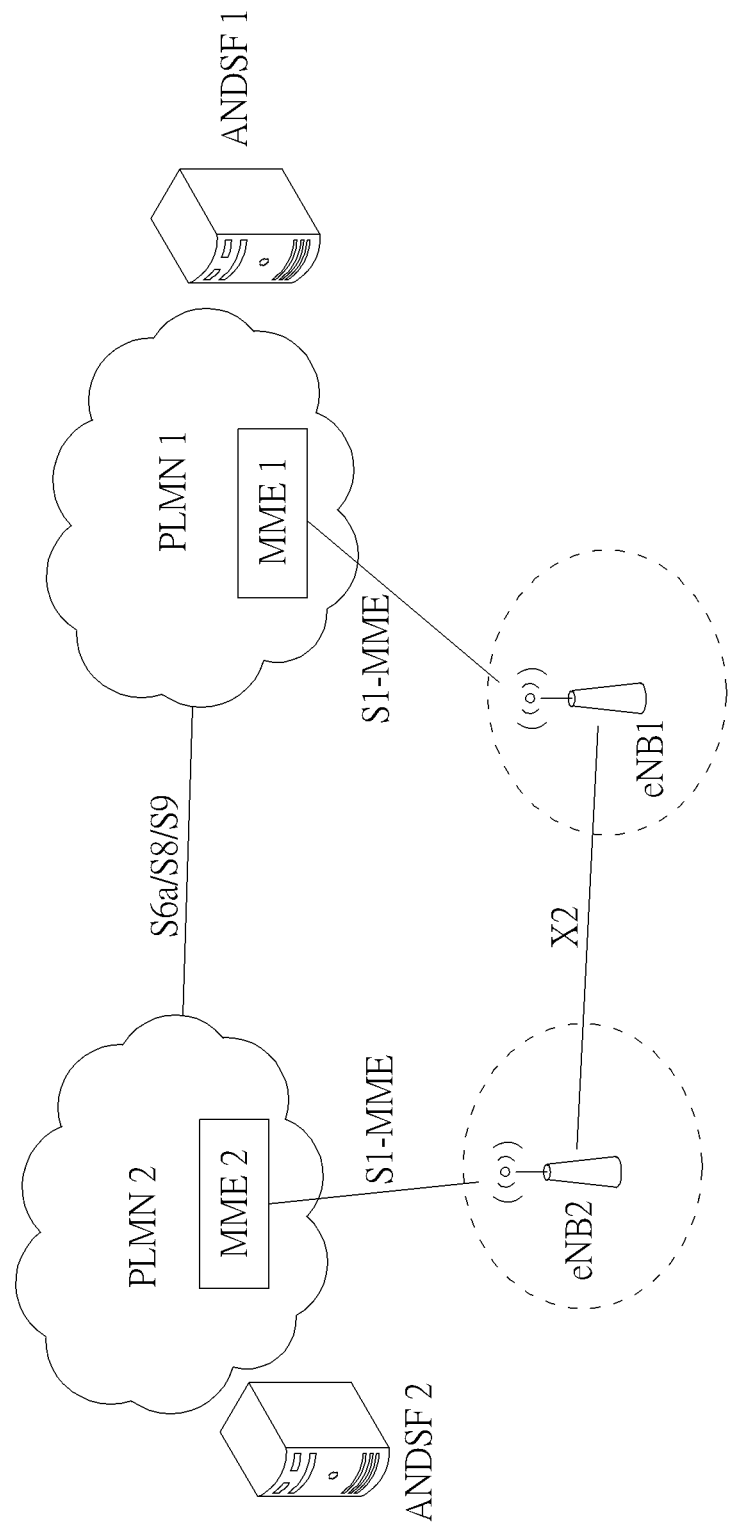
FIG. 4 is a schematic diagram of a wireless communication system.

Please refer to FIG. 4, which is a schematic diagram of a wireless communication system. The wireless communication system is a LTE system or other mobile communication systems, and is briefly composed of at least a device (i.e. a UE), an access node (i.e. an eNB), an anchor node (i.e. a MME) and a server node (i.e. ANDSF/OAM server) of PLMN. Note that, FIG. 4 is simply utilized for illustrating the structure of the wireless communication system, where the number of UEs, eNBs, MMEs and ANDSF servers are not limited herein. The UEs can be devices such as mobile phones, computer systems, machine type devices, etc. Besides, the network node and the UE can be seen as a transmitter or receiver according to transmission direction, e.g., for uplink (UL), the UE is the transmitter and the network node is the receiver, and for downlink (DL), the network node is the transmitter and the UE is the receiver.

Figure 5:
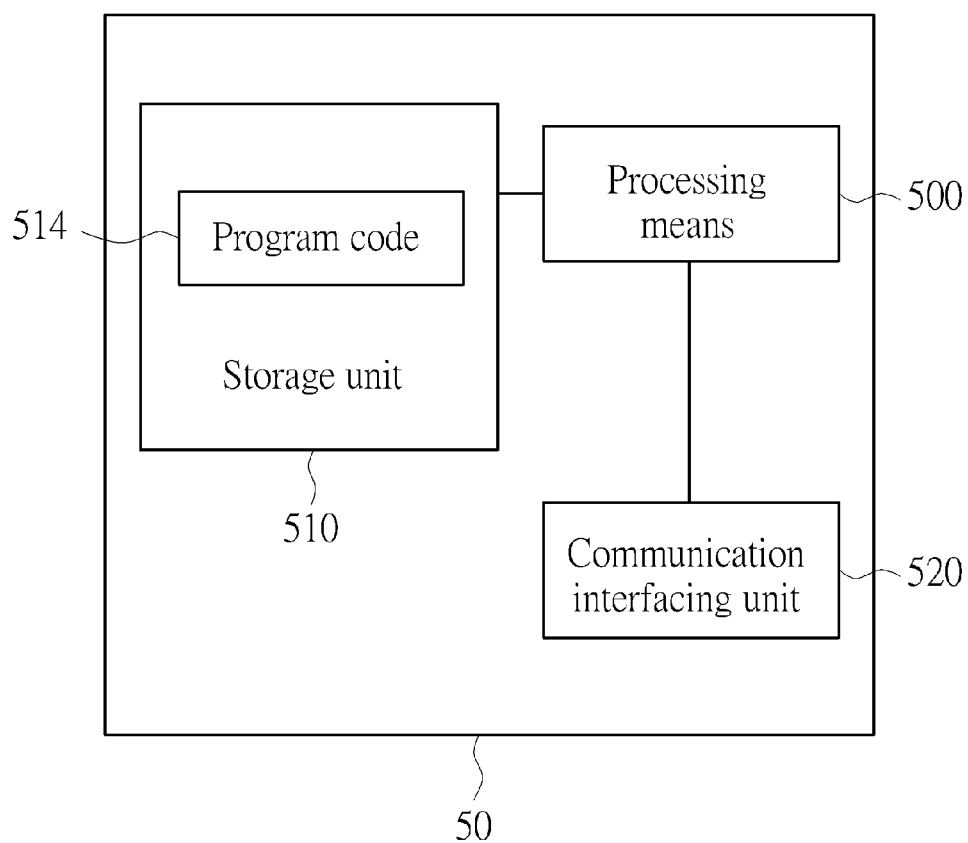
FIG. 5 is a schematic diagram of an exemplary communication device.

FIG. 5 illustrates a schematic diagram of an exemplary communication device 50. The communication device 50 can be the device or network node shown in FIG. 4. The communication device 50 may include a processing means 500 such as a microprocessor or Application Specific Integrated Circuit (ASIC), a storage unit 510 and a communication interfacing unit 520. The storage unit 510 may be any data storage device that can store program code 514, for access by the processing means 500. Examples of the storage unit 510 include but are not limited to a subscriber identity module (SIM), read-only memory (ROM), flash memory, random-access memory (RAM), CD-ROMs, magnetic tape, hard disk, and optical data storage device. The communication interfacing unit 520 is preferably a radio transceiver and can exchange wireless signals with a network node according to processing results of the processing means 500.

Figure 1:
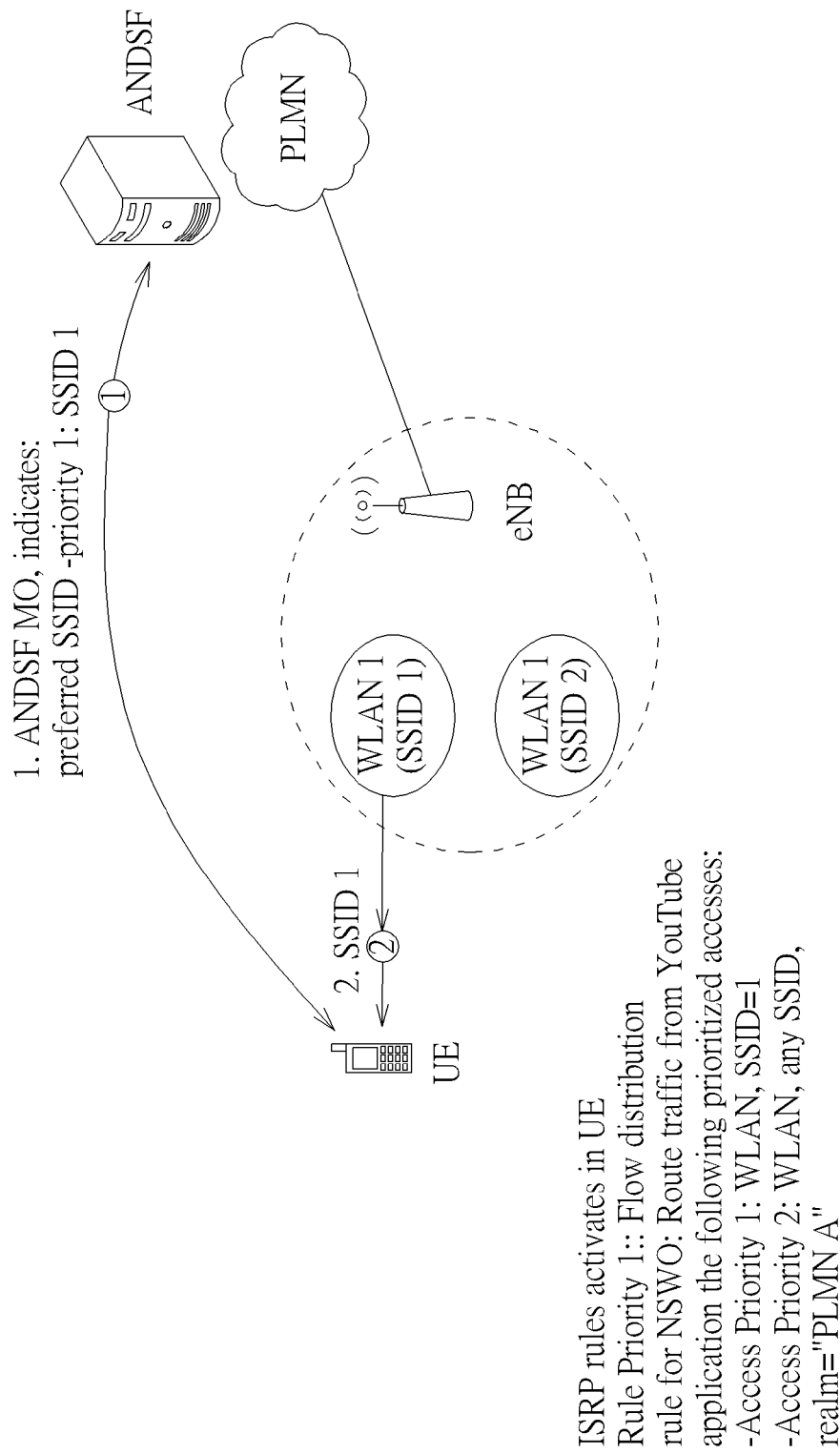
FIG. 1 is a schematic diagram of an ANDSF operation according to the prior art.
Figure 2:
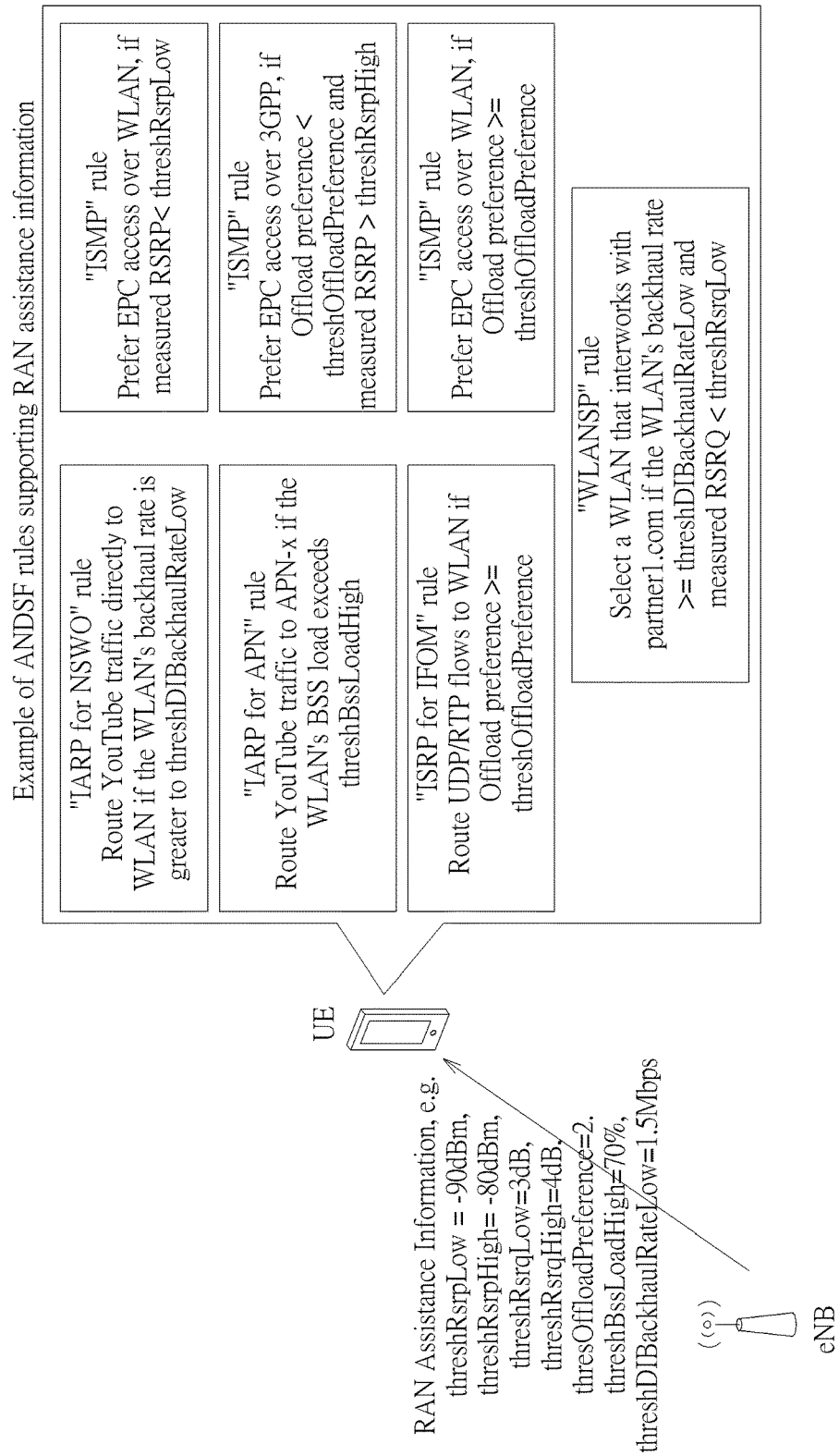
FIG. 2 is a schematic diagram of ANDSF rules supporting RAN assistance information.
Figure 3:
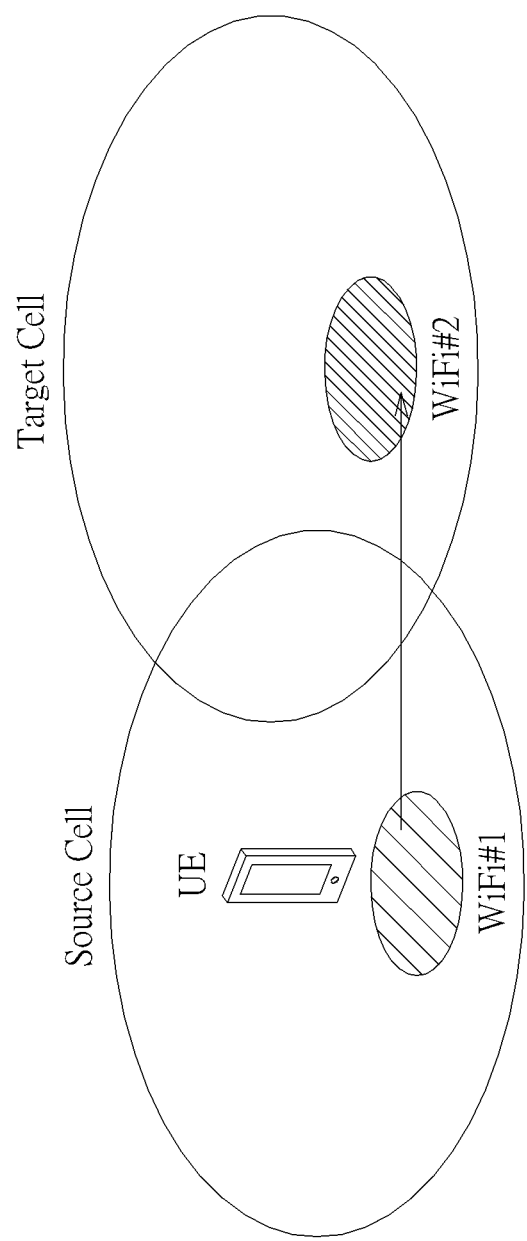
FIG. 3 is a schematic diagram of a handover procedure of a UE supporting an ANDSF operation.
Figure 6:
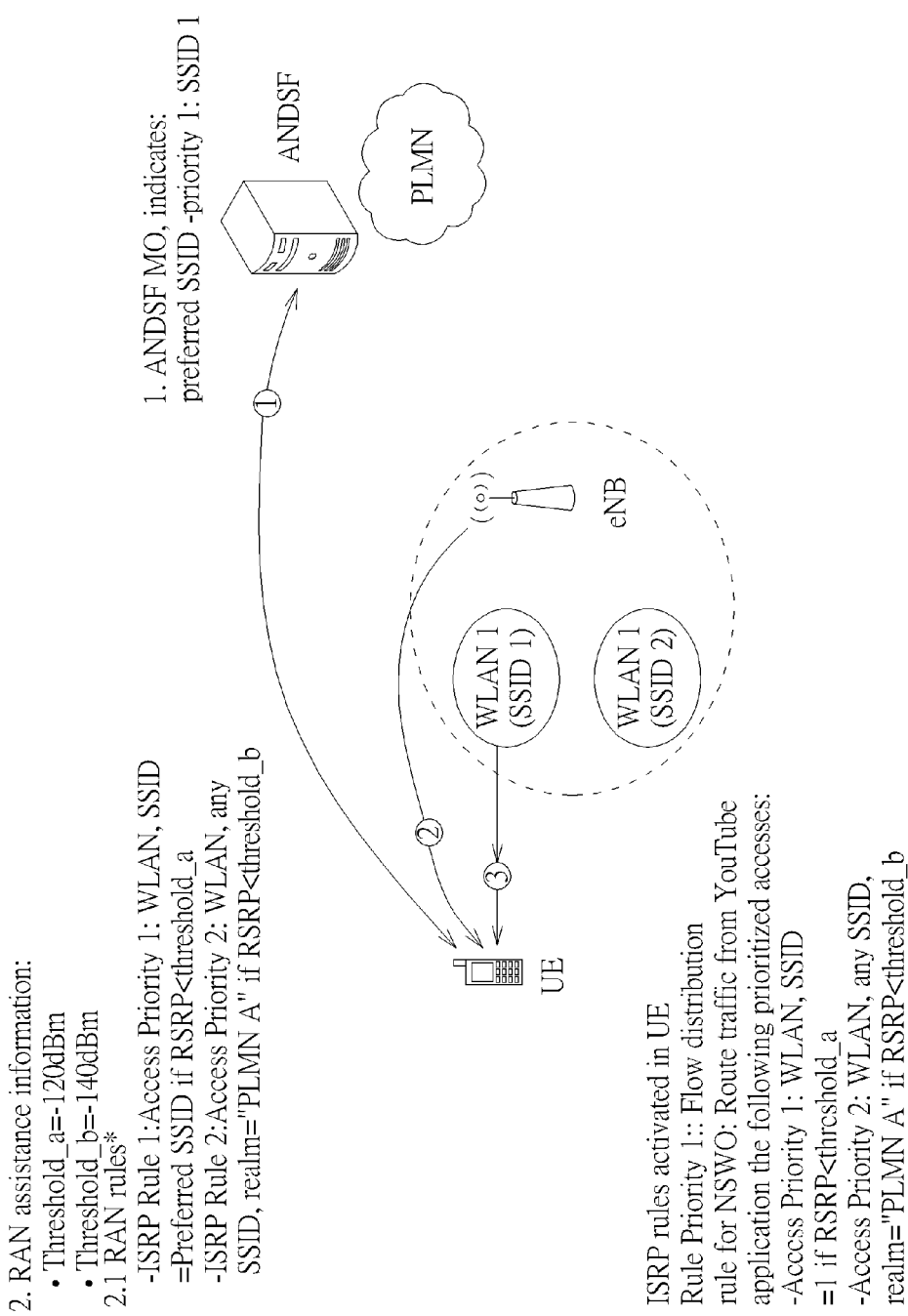
FIG. 6 is a schematic diagram of an enhanced ANDSF operation.

Please refer to FIG. 6, which illustrates an enhanced ANDSF operation according to the present invention. Compared to the legacy ANDSF operation of FIG. 1, the enhanced ANDSF (eANDSF) operation includes RAN (Radio Access Network) assistance information and/or RAN rules to enhance the efficiency of network discovery and selection for the UE. RAN assistance information and RAN rules are information provided by RAN element (e.g. eNB) that reflects the current RAN situation (i.e. a radio condition, available bandwidth, etc.). RAN rules are the rules which are given by RAN element and utilize RAN assistance information.

Figure 7:
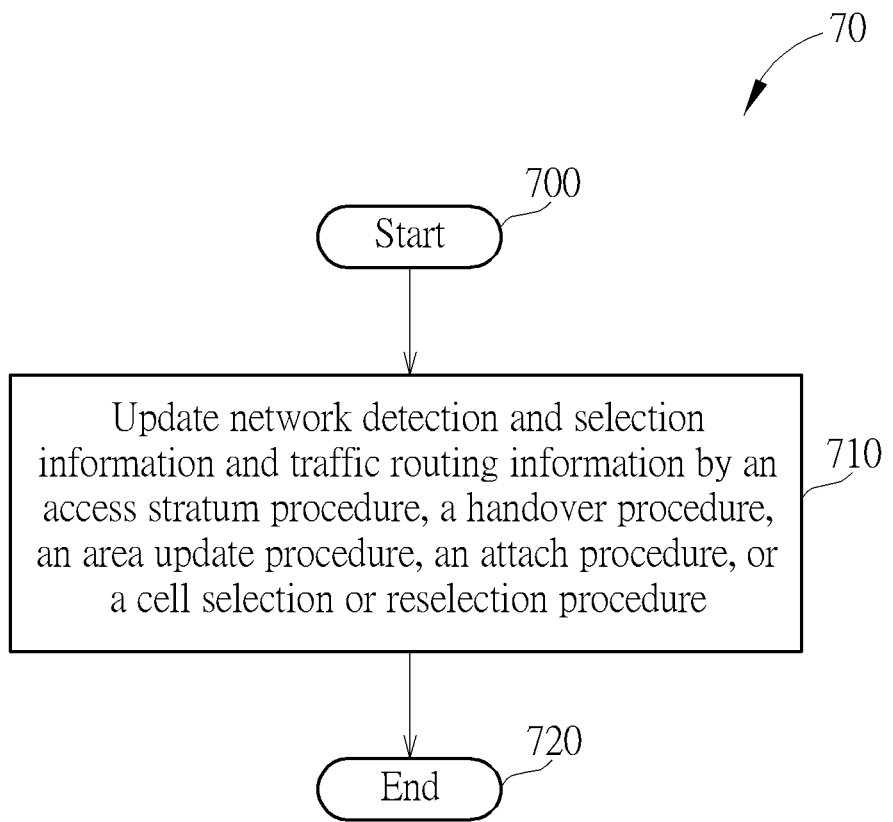
FIG. 7 is a flowchart of an exemplary process according to the present disclosure.

Please refer to FIG. 7, which is a flowchart of a process 70 according to an example of the present disclosure. The process 70 is utilized in the UE, eNB, MME or ANDSF server of FIG. 5 for updating network detection and selection information and traffic routing information. The process 70 may be compiled into a program code 514 to be stored in the storage unit 510, and may include the following steps:

Step 700: Start.

Step 710: Update network detection and selection information and traffic routing information by an access stratum procedure, a handover procedure, an area update procedure, an attach procedure, or a cell selection or reselection procedure.

Step 720: End.

According to the process 70, the network detection and selection information and traffic routing information, including RAN assistance information and RAN rules, hereafter called RAN info, is updated via signaling/message of access stratum procedure, handover procedure, area update procedure, attach procedure, or cell selection or reselection procedure. In addition, RAN info may be updated when the UE moves into a PLMN serving area, when the UE moves into the coverage of a cell, when the UE moves into the area of a cell cluster, or when the UE moves into the area of a heterogeneous network (HetNet).

Figure 8:
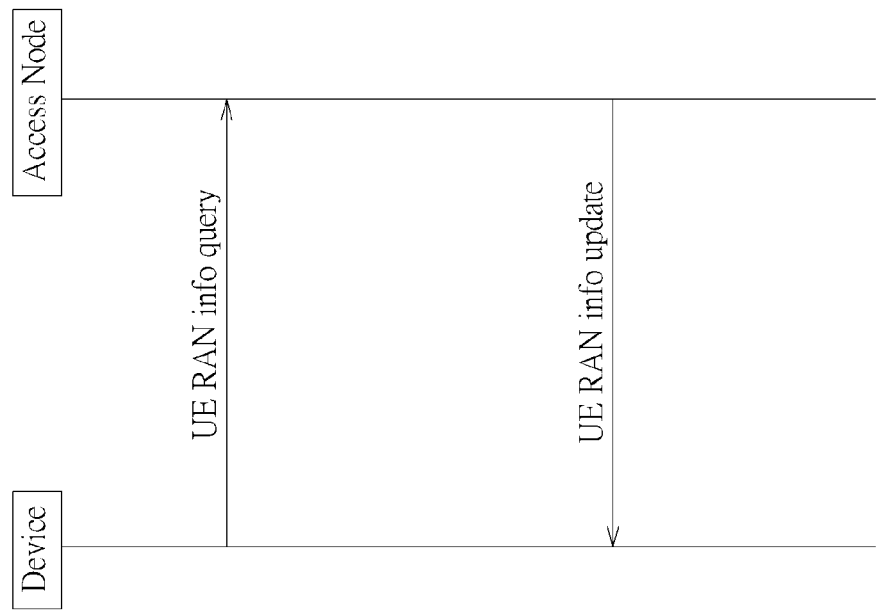
FIGS. 8-12 illustrate a message flow of an access stratum procedure for RAN info update.

Some examples based on the process 70 are here described. FIGS. 8-12 illustrate the message flow of an access stratum procedure for RAN info update. In FIG. 8, the device (i.e. a UE) queries the access node (i.e. an eNB) to obtain RAN info by sending a UE RAN info query message to the serving access node to query RAN info. The access node which receives the UE RAN info query message from the device should reply to the requiring device a UE RAN info update message with RAN info.

The UE RAN info query message may include an indicator of interworking preference (e.g., offload preference, radio access type (RAT) preference), indicator of the cause of request (e.g., request for RAN assistance information), indicator of the capability to support RAN rules, indicator of the capability to support RAN assistance information, capability of supported 3GPP release, capability of supported RAN rules, capability of supported RAN assistance information, and/or capability of supported RAN rules and RAN assistance information sets. The implementation of the UE RAN info query message could be a new message, or one of the following messages: UECapabilityInformation, Measurement Report, RRCConnection Request and RRCConnection Setup Complete.

The UE RAN info update message may include applied RAN assistance information (e.g., RAN assistance information set), applied RAN rules (e.g., rule set), RAN assistance information (e.g., content of RAN assistance information), RAN rules (e.g., content of RAN rules), the configuration of RAN rules sets, the configuration of RAN assistance information sets, the configuration of RAN rules and RAN assistance information sets, supported RAN rule sets of other cells, supported RAN assistance information sets of other cells, and/or supported RAN rules and RAN assistance information sets of other cells. The implementation of the UE RAN info update message could be a new message, or one of the following messages: RRCConnectionReconfiguration, MeasurementControl.

Figure 9:
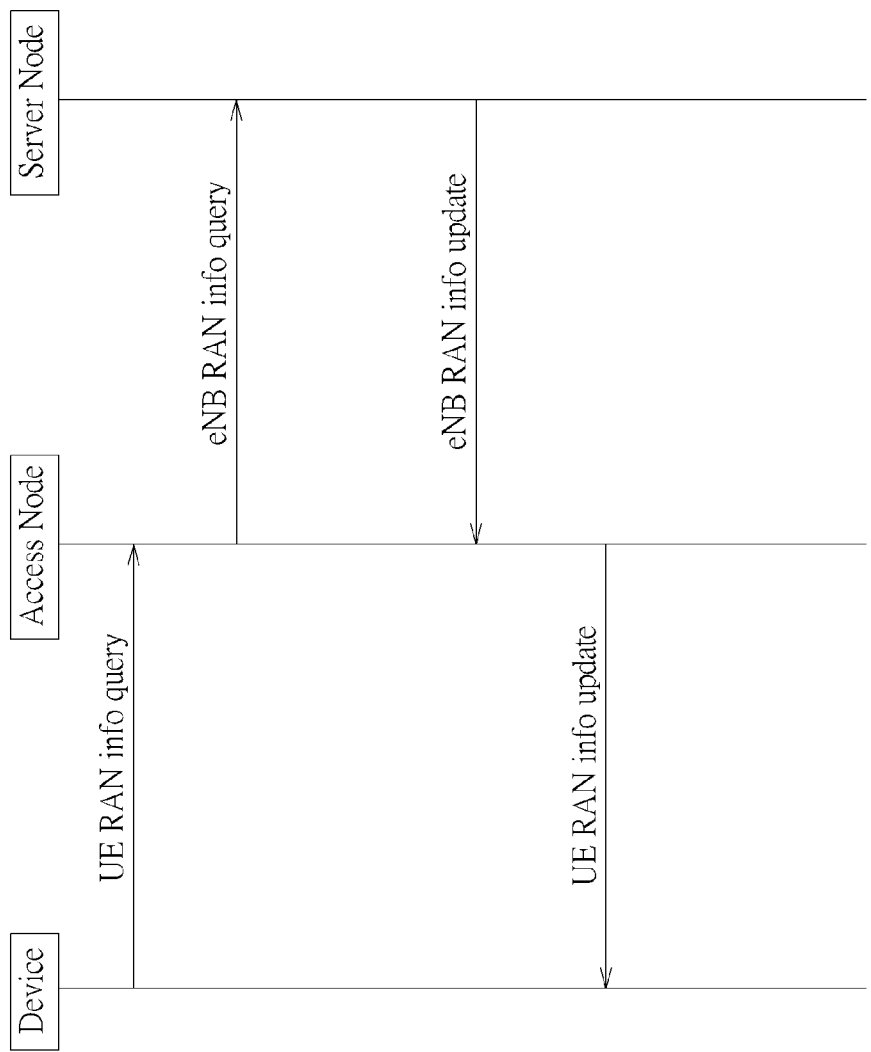

In FIG. 9, the device sends a UE RAN info query message to the serving access node to query RAN info. The access node which receives from the device a UE RAN info query message then sends an eNB RAN info query message to the associated server node to query RAN info. When the server node receives an eNB RAN info query message from the access node, the server node sends an eNB RAN info update message with RAN info to the requiring access node. When the access node receives from the server node an eNB RAN info update message with RAN info that associates to an eNB RAN info query message issued by the access node, the access node should then send a UE RAN info update message with RAN info to the corresponding requesting device.

The eNB RAN info query message is used by the access node to query the latest RAN info from the server node, and may include indicator of interworking preference (e.g., offload preference, RAT preference), indicator of the cause of request (e.g., request for RAN rules), indicator of the capability to support RAN rules, indicator of the capability to support RAN assistance information, capability of supported 3GPP release, capability of supported RAN rules, capability of supported RAN assistance information, and/or capability of supported RAN rules and RAN assistance information sets.

The eNB RAN info update is used by the server node to deliver RAN info to the access node and may comprise applied RAN assistance information (e.g., RAN assistance information set), Applied RAN rules (e.g., rule set), RAN assistance information (e.g., content of RAN assistance information), RAN rules (e.g., content of RAN rules), the configuration of RAN rules sets, the configuration of RAN assistance information sets, the configuration of RAN rules and RAN assistance information sets, supported RAN rule sets of other cells, supported RAN assistance information sets of other cells and/or supported RAN rules and RAN assistance information sets of other cells.

Figure 10:
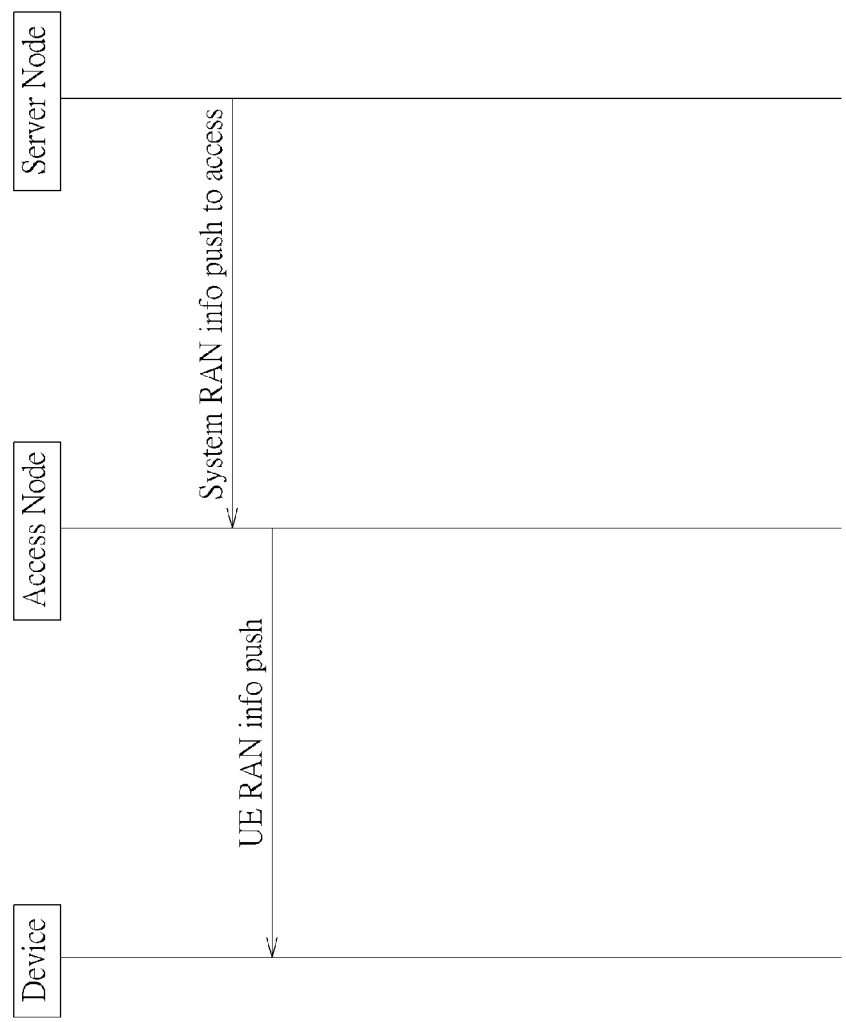

In FIG. 10, when the access node receives a System RAN info push to access message with RAN info from the associated server node, the access node sends a UE RAN info push message with RAN info to the device in the service coverage of the access node.

The system RAN info push to access message is used by the server node to deliver the RAN info to one or more access nodes and may comprise applied RAN assistance information, Applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells, supported RAN rules and RAN assistance information sets of other cells.

The UE RAN info push message is used by the access node to deliver RAN info to one or more devices and comprises applied RAN assistance information (e.g., RAN assistance information set), applied RAN rules (e.g., rule set), RAN assistance information (e.g., content of RAN assistance information), RAN rules (e.g., content of RAN rules), the configuration of RAN rules sets, the configuration of RAN assistance information sets, the configuration of RAN rules and RAN assistance information sets, supported RAN rule sets of other cells, supported RAN assistance information sets of other cells, supported RAN rules and RAN assistance information sets of other cells. The implementation of the UE RAN info push message could be a new message, or one of the following messages: RRCConnection Reconfiguration, MeasurementControl, Paging or SIB (System Information block).

Figure 11:
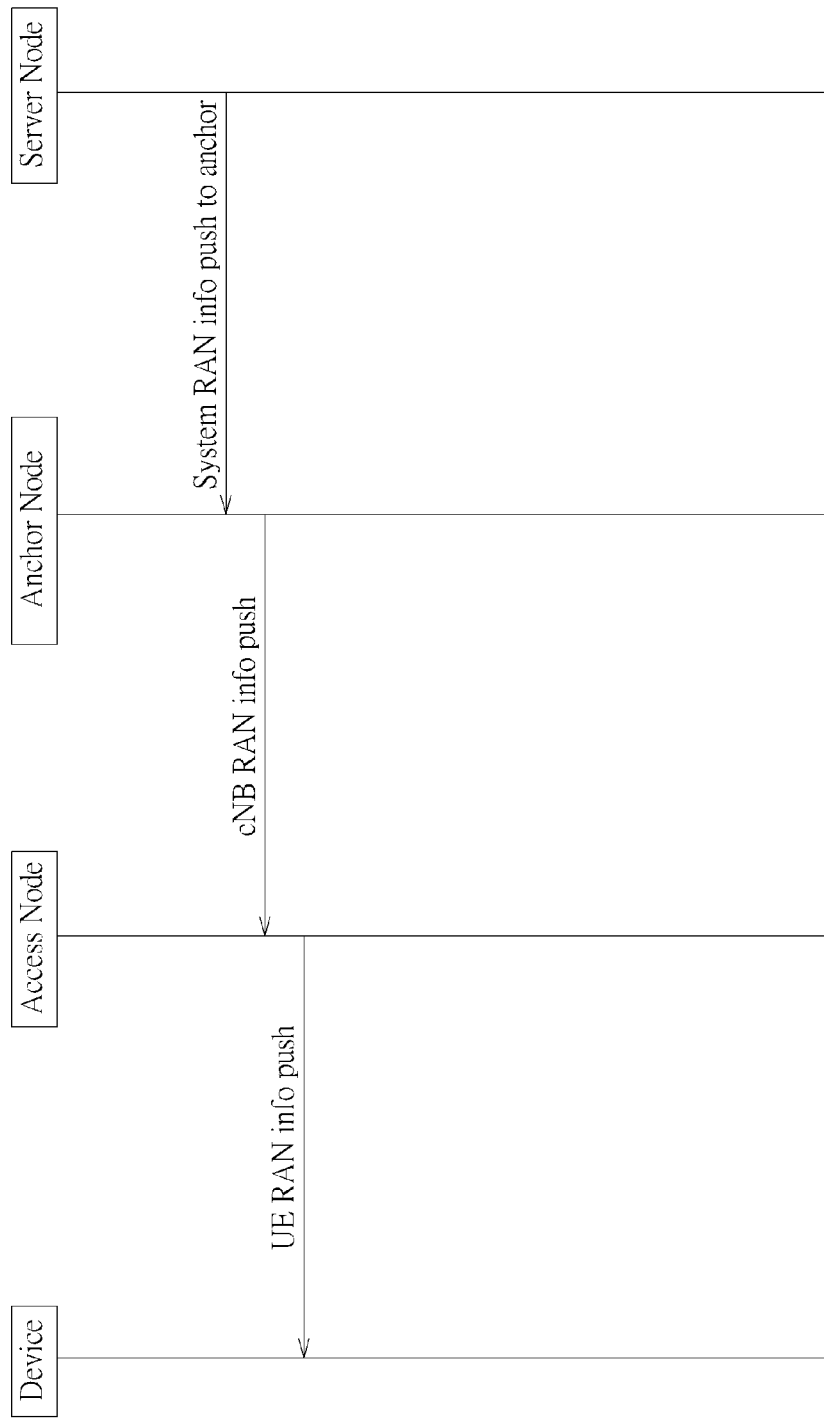

In FIG. 11, when the anchor node receives from the associated server node a System RAN info push to anchor message with RAN info, the anchor node then sends an eNB RAN info push message with RAN info to the associated access nodes. When the access node receives an eNB RAN info push message from an associated anchor node, the access node then sends a UE RAN info push message with RAN info to the device in the service coverage of the access node.

The system RAN info push to anchor message is used by the server node to deliver RAN info to one or more anchor node, and may include applied RAN assistance information, applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells, and/or supported RAN rules and RAN assistance information sets of other cells.

The eNB RAN info push message is used by the anchor node to delivery RAN info to one or more access node and may include applied RAN assistance information, applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells and/or supported RAN rules and RAN assistance information sets of other cells.

Figure 12:
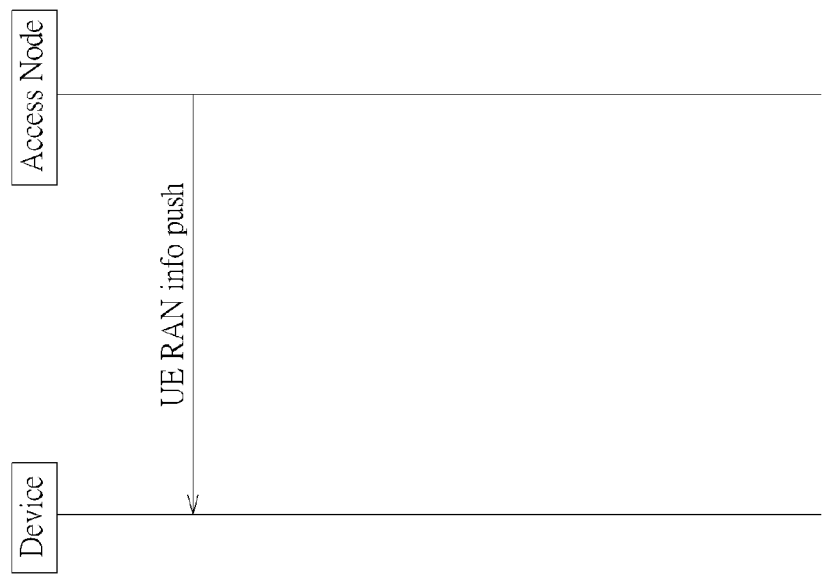

In FIG. 12, the access node sends a UE RAN info push message with RAN info to the device in the service coverage of the access node.

Figure 13:
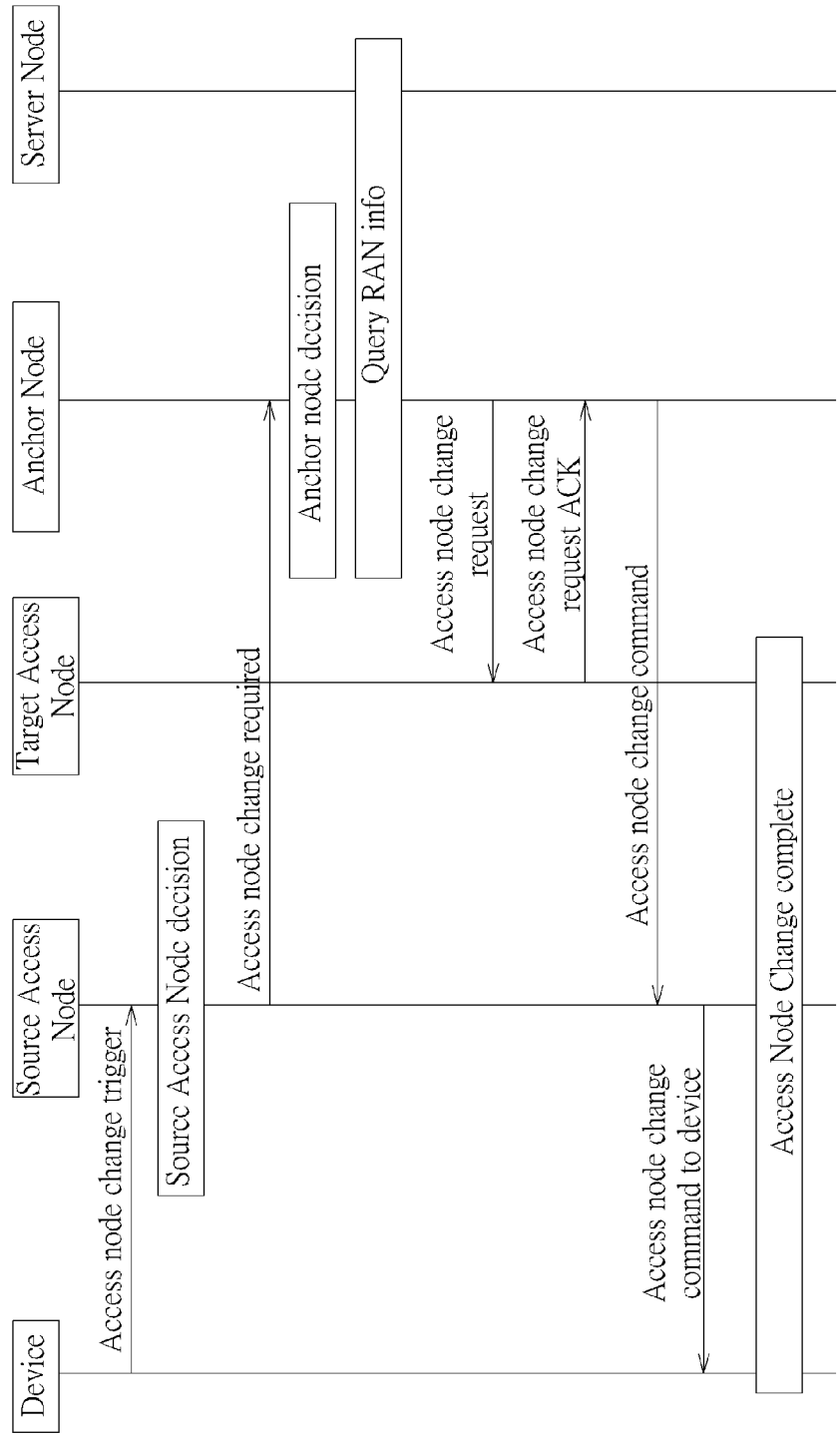
FIGS. 13-24 illustrate a message flow of a handover procedure for RAN info update.

FIGS. 13-24 illustrate a message flow of a handover procedure for RAN info update. In FIG. 13, the device served by the source access node is moving from the service coverage of the source access node to the service coverage of the target access node. The source access node receives an access node change trigger message from the device and makes decision according to the information carried in the access node change trigger message. Then the source access node sends an access node change required message to the associated anchor node. The anchor node received an access node change required message makes decision according to the information carried in the access node change required message. The anchor node may query the associated server node for RAN info if necessary. The anchor node sends an access node change request message with RAN info to the target access node to request for changing the access node of the device from the source access node to the target access node. The access node receives from the anchor node an access node change request message should reply with an access node change request acknowledgement (ACK) message to the anchor node. When the anchor node receives from the target access node an access node change request ACK message which associated with the access node change request message issued from the anchor node to the target access node, the anchor node sends an access node change command message with RAN info to the source access node. When the source access node receives an access node change command message with RAN info, and the access node change command message associated with an access node change required message which was issued by the source access node to the anchor node, the source access node sends an access node change command to device message with RAN info to the device which issued the associated access node change trigger message. Then the access node change complete procedure is performed.

The access node change trigger message may include indicator of interworking preference (e.g., offload preference, RAT preference), indicator of the cause of request (e.g., request for RAN assistance information), indicator of the capability to support RAN rules, indicator of the capability to support RAN assistance information, capability of supported 3GPP release (e.g., rel-10, rel-12), capability of supported RAN rules, capability of supported RAN assistance information, capability of supported RAN rules and RAN assistance information sets, and measurement results that may include measurement result ID, measResultPCell, measResultNeighCells.

The access node change required message may include indicator of interworking preference (e.g., offload preference, RAT preference), indicator of the cause of request (e.g., request for RAN assistance information), indicator of the capability to support RAN rules, indicator of the capability to support RAN assistance information, capability of supported 3GPP release, capability of supported RAN rules, capability of supported RAN assistance information, capability of supported RAN rules and RAN assistance information sets, Message type, MME UE SIAP ID, eNB UE S1AP ID, handover type, cause, target ID, source to target transparent container.

The access node change request message may include applied RAN assistance information, applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells, supported RAN rules and RAN assistance information sets of other cells, Message type, MME UE SIAP ID, Handover type, cause, E-RABs To Be Setup List, UE Aggregate Maximum Bit Rate, Source to Target Transparent Container, UE Security Capabilities, Security Context.

The Access node change request ACK message may include applied RAN assistance information, applied RAN rules, RAN assistance information; RAN rules, the configuration of RAN rules sets, the configuration of RAN assistance information sets, the configuration of RAN rules and RAN assistance information sets, supported RAN rule sets of other cells, supported RAN assistance information sets of other cells, supported RAN rules and RAN assistance information sets of other cells, Message type, MME UE SIAP ID, eNB UE S1AP ID, E-RABs To Be Setup List, Target to Source Transparent Container, UE Security Capabilities, Security Context.

The access node change command message is used by the anchor node to deliver the RAN info to the source access node, thus the source access node may include applied RAN assistance information, Applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells, supported RAN rules and RAN assistance information sets of other cells, Message type, MME UE SIAP ID, eNB UE S1AP ID, Handover type, E-RABs To Be Setup List, Target to Source Transparent Container.

The access node change command to device message is used by the source access node to deliver the RAN info of the target access node to the device, and may include applied RAN assistance information, applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells, supported RAN rules and RAN assistance information sets of other cells, Message type, MME UE SIAP ID, eNB UE S1AP ID, Handover type, E-RABs To Be Setup List, Target to Source Transparent Container.

Figure 14:
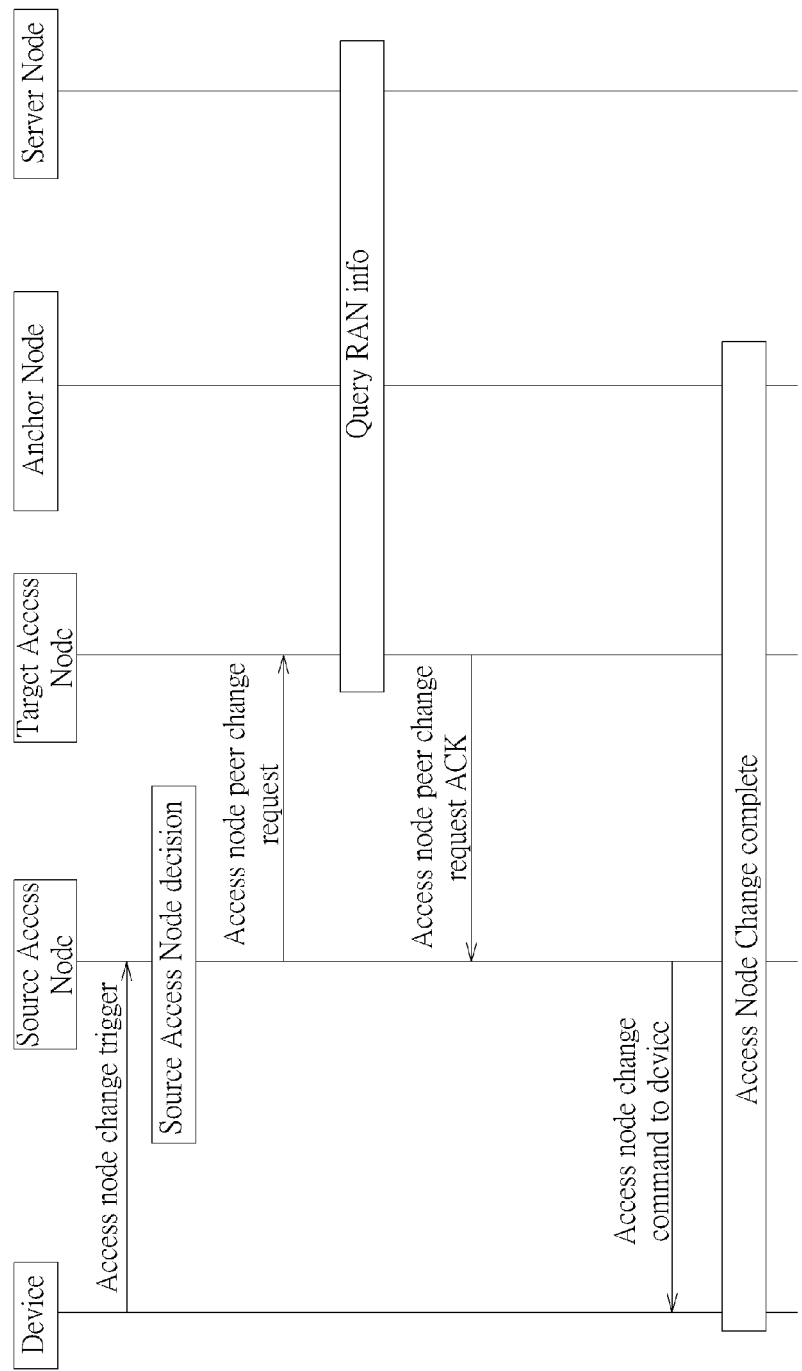

In FIG. 14, the device served by a source access node is moving from the service coverage of the source access node to the service coverage of the target access node. The source access node receives an access node change trigger message from the device and makes decision according to the information carried in the access node change trigger message. The source access node sends an access node peer change request message to the target access node. The target access node received an access node peer change request message may query the associated server node for RAN info if necessary. The target access node sends an access node peer change request ACK message with RAN info to the source access node. When the source access node receives an access node peer change request ACK message with RAN info, and the access node peer change request ACK message associated with an access node peer change request message which was issued by the source access node to the target access node, the source access node sends an access node change command to device message with RAN info to the device which issued the associated access node change trigger message. Then the access node change complete procedure is performed.

The access node peer change request message may include applied RAN assistance information, applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells, supported RAN rules and RAN assistance information sets of other cells, Message type, MME UE SIAP ID, Handover type, cause, E-RABs To Be Setup List, UE Aggregate Maximum Bit Rate, Source to Target Transparent Container, UE Security Capabilities, Security Context.

The Access node peer change request ACK message may include applied RAN assistance information, applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells, supported RAN rules and RAN assistance information sets of other cells, Message type, MME UE SIAP ID, eNB UE SIAP ID, E-RABs To Be Setup List, Target to Source Transparent Container, UE Security Capabilities, Security Context.

Figure 15:
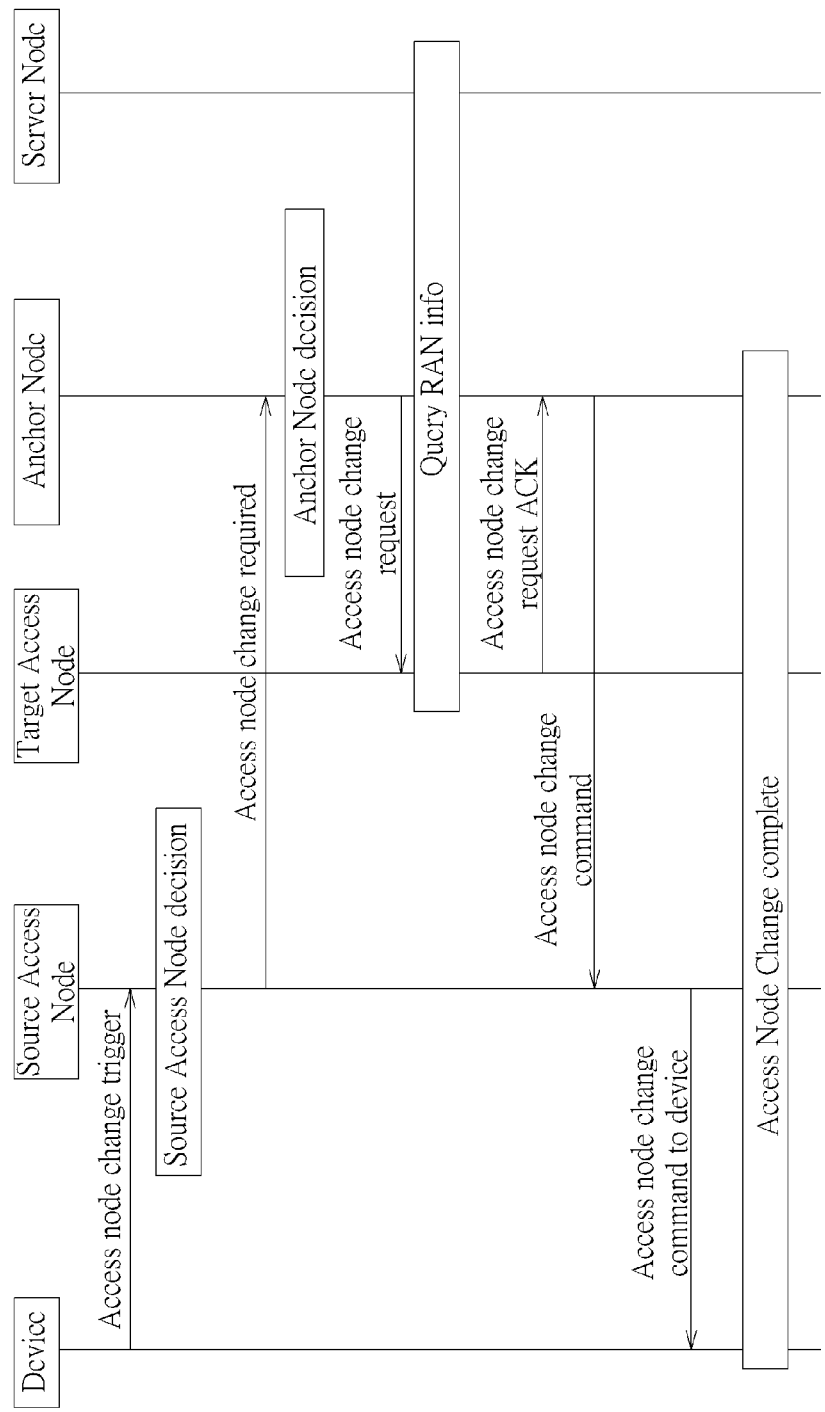
Figure 16:
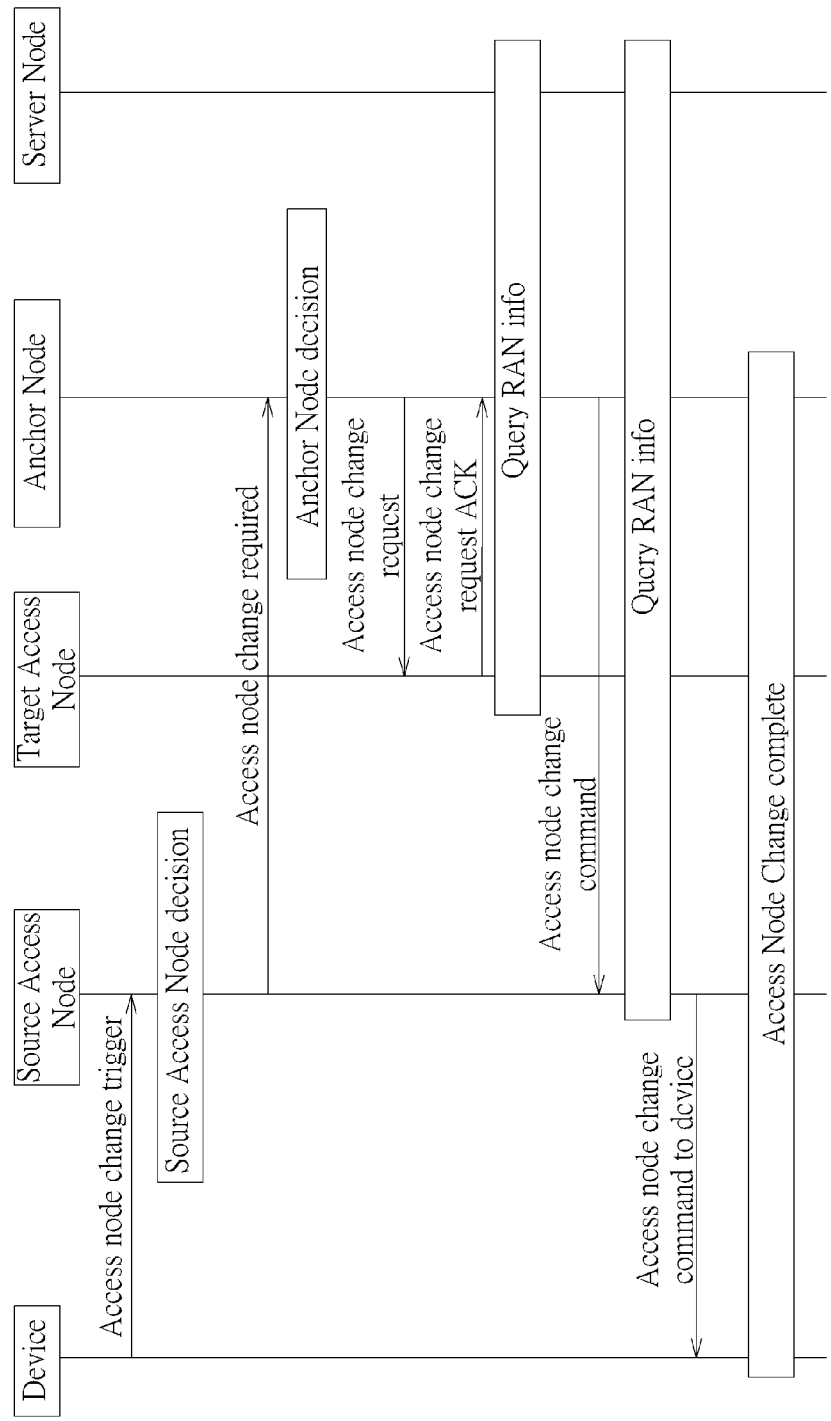

FIG. 15 illustrates a message flow with different sequence to the FIG. 13. As can be seen, in FIG. 15, a query RAN info step is arranged between the access node change request and access node change request ACK. In other words, the target access node requests RAN info from server node by itself. When the target access node receives RAN info from the server node, the target access node sends an access node change request ACK message with RAN info to the anchor node. Other messages remain the same sequence as in FIG. 13, so the detailed description can be referred from above. Similarly, FIG. 16 illustrates a different message sequence to the FIG. 13. The access node change request and access node change request ACK is arranged before the query RAN info step. When the anchor node receives the access node change request ACK from the target access node, the anchor node performs the query RAN info procedure to obtain the RAN info corresponding to the target access node for the device which initiated the procedure by sending the access node change trigger message to the source access node.

Figure 17:
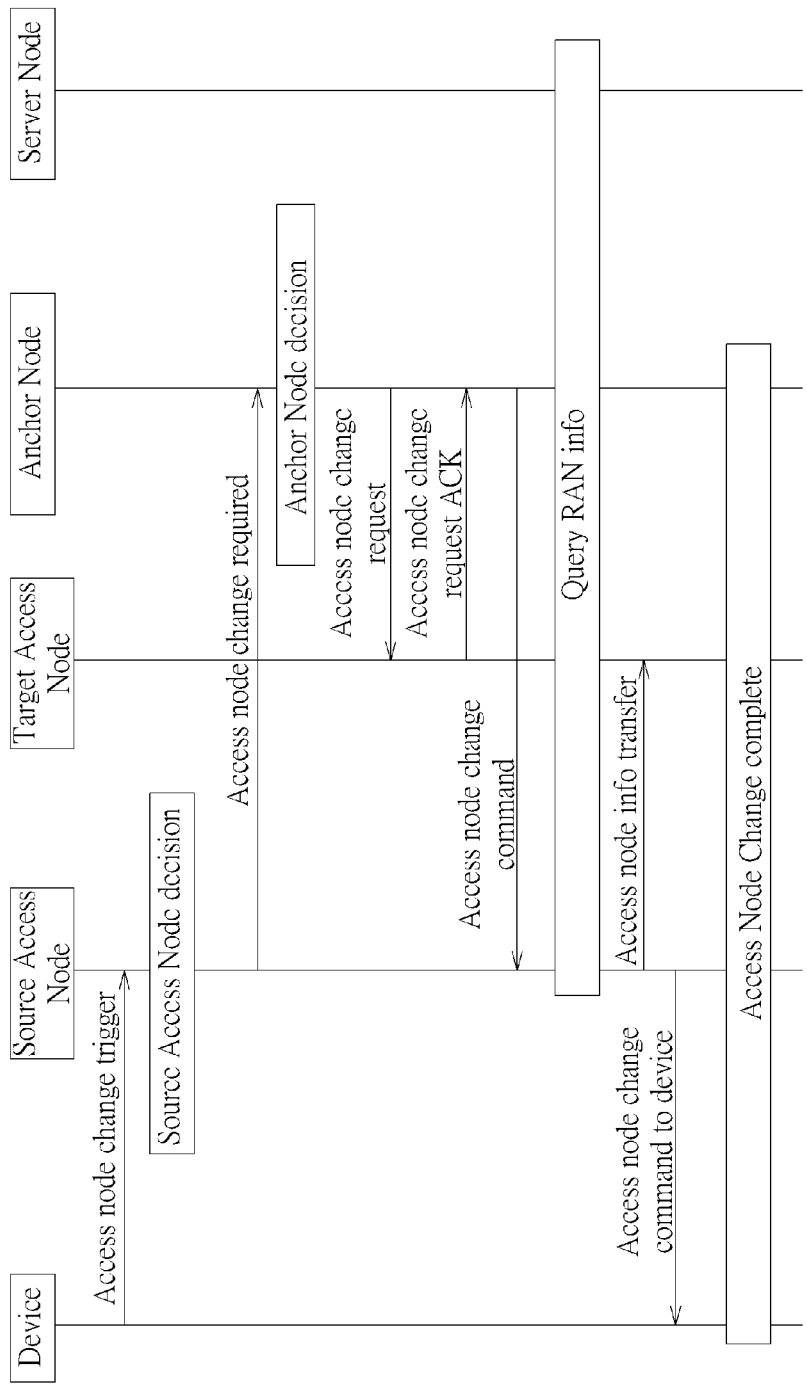

In FIG. 17, the device served by the source access node is moving from the service coverage of the source access node to the service coverage of the target access node. The source access node receives access node change trigger message from the device and makes decision according to the information carried in the access node change trigger message. Then the source access node sends an access node change required message to the associated anchor node. The anchor node received an access node change required message makes decision according to the information carried in the message. Then the anchor node sends an access node change request message to the target access node to request for changing the access node of the device from the source access node to the target access node. The target access node which receives an access node change request message from an anchor node then sends an access node change request ACK message to the anchor node. When the anchor node receives from the target access node an access node change request ACK message associated with an access node change request message issued from the anchor node to the target access node, the anchor node sends an access node change command message to the associated source access node. When the source access node receives from the anchor node an access node change command message associated with an access node change required message which was issued by the source access node to the anchor node, the source access node may query the associated server node for RAN info if necessary. The source access node sends an access node info transfer message with RAN info to the target access node. The source access node sends an access node change command to device message with RAN info to the device which issued the associated access node change trigger message. Then the access node change complete procedure is performed.

The access node info transfer is used by the source access node to deliver the RAN info to the target access node and may include applied RAN assistance information, applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells, supported RAN rules and RAN assistance information sets of other cells.

Figure 18:
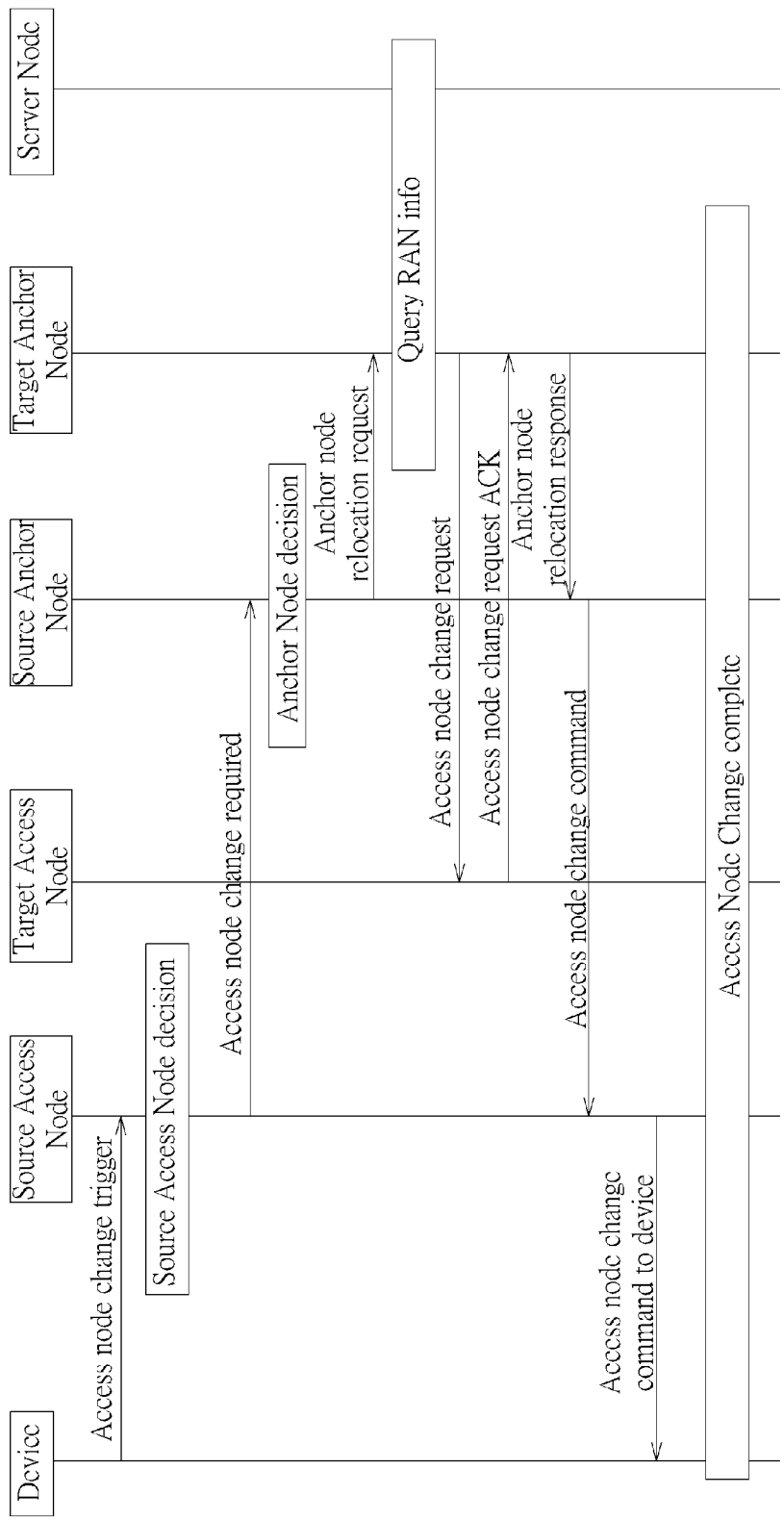

In FIG. 18, the device served by the source access node is moving from the service coverage of the source access node to the service coverage of the target access node. The source access node receives an access node change trigger message from the device and makes decision according to the information carried in the access node change trigger message. Then the source access node sends an access node change required message to the associated source anchor node. The source anchor node received an access node change required message makes decision according to the information carried in the message. Then the source anchor node sends an anchor node relocation request message to the target anchor node. The target anchor node received an anchor node relocation request may query the associated server node for RAN info if necessary. The target anchor node sends an access node change request message with RAN info to the target access node to request for changing the access node of the device from the source access node to the target access node. When the target access node receives an access node change request message from the target anchor node, the target access node sends an access node change request ACK message to the target anchor node. When the target anchor node receives from the target access node an access node change request ACK message which associated with an access node change request message issued from the target anchor node to the target access node, the target anchor node sends an anchor node relocation response message with RAN info to the source anchor node. The source anchor node received from the target anchor node an anchor node relocation response message associated with an anchor node relocation request message which was issued by the source anchor node to the target anchor node, the source anchor node sends an access node change command message with RAN info to the associated source access node. When the source access node receives from a source anchor node an access node change command message with RAN info, and the access node change command message associated with an access node change required message which was issued by the source access node to the source anchor node, the source access node sends an access node change command to device message with RAN info to the device which issued the associated access node change trigger message. Then the access node change complete procedure is performed.

The anchor node relocation request message may include indicator of interworking preference (e.g., offload preference, RAT preference), indicator of the cause of request (e.g., request for RAN assistance information), indicator of the capability to support RAN rules, indicator of the capability to support RAN assistance information, capability of supported 3GPP release, capability of supported RAN rules, capability of supported RAN assistance information, capability of supported RAN rules and RAN assistance information sets, MME UE context, Source to Target transparent container, RAN Cause, Target eNB Identity, CSG ID; CSG Membership Indication, Target TAI, MS Info Change Reporting Action, CSG Information Reporting Action, UE Time Zone, Direct Forwarding Flag, Serving Network, applied RAN assistance information, applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells, and supported RAN rules and RAN assistance information sets of other cells.

The anchor node relocation response message may include applied RAN assistance information, applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells, supported RAN rules and RAN assistance information sets of other cells, Cause, Target to Source transparent container, Serving GW change indication, EPS Bearer Setup List and Addresses and TEIDs.

Figure 19:
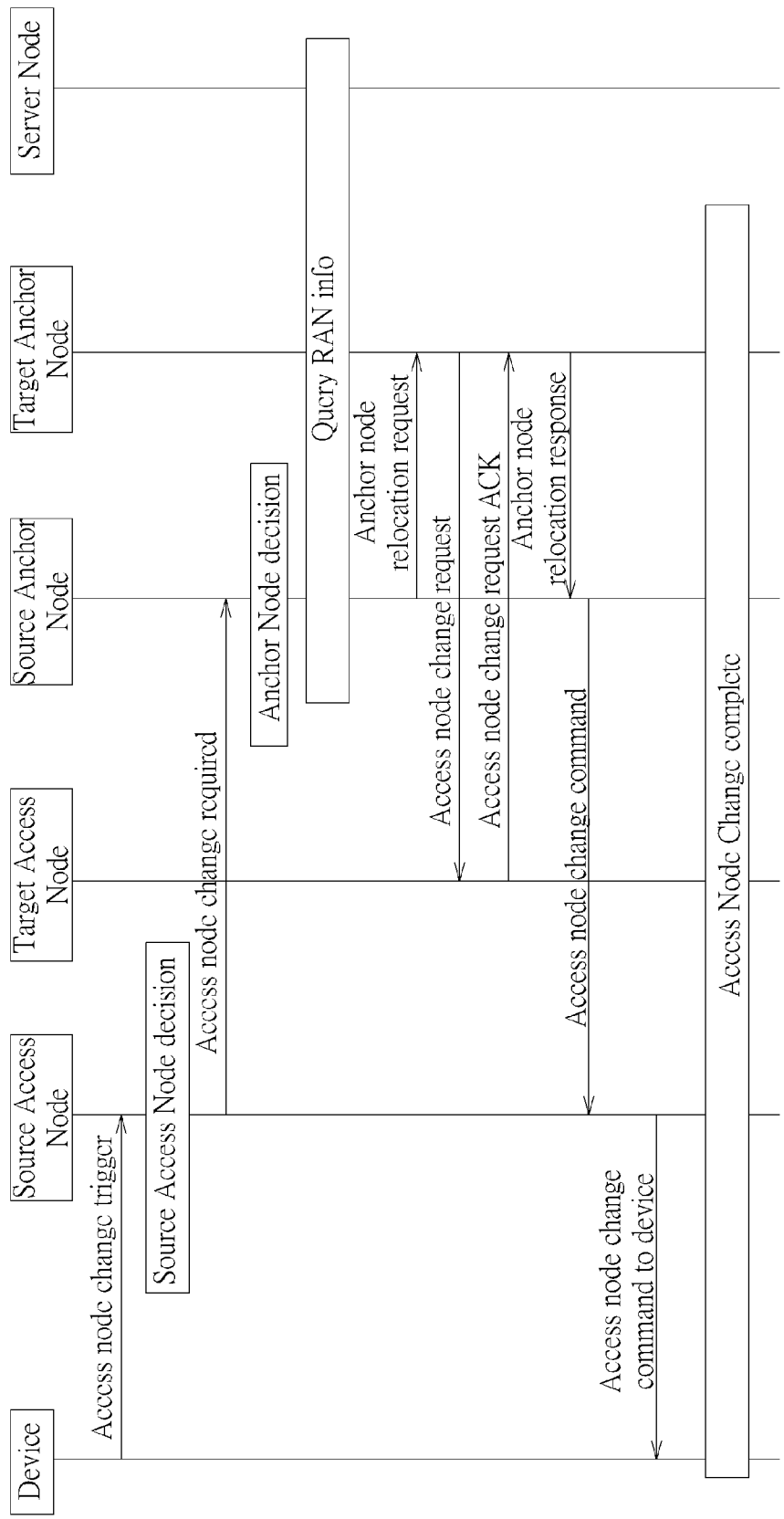

FIG. 19 illustrates a message flow with different sequence to the FIG. 18. As can be seen, in FIG. 19, the RAN info query step is arranged before the anchor node relocation request. When the source anchor node obtains the RAN info, the source anchor node sends an anchor node relocation request message with RAN info to the target anchor node. Other messages remain the same sequence as in FIG. 18, so the detailed description can be referred from above.

Figure 20:
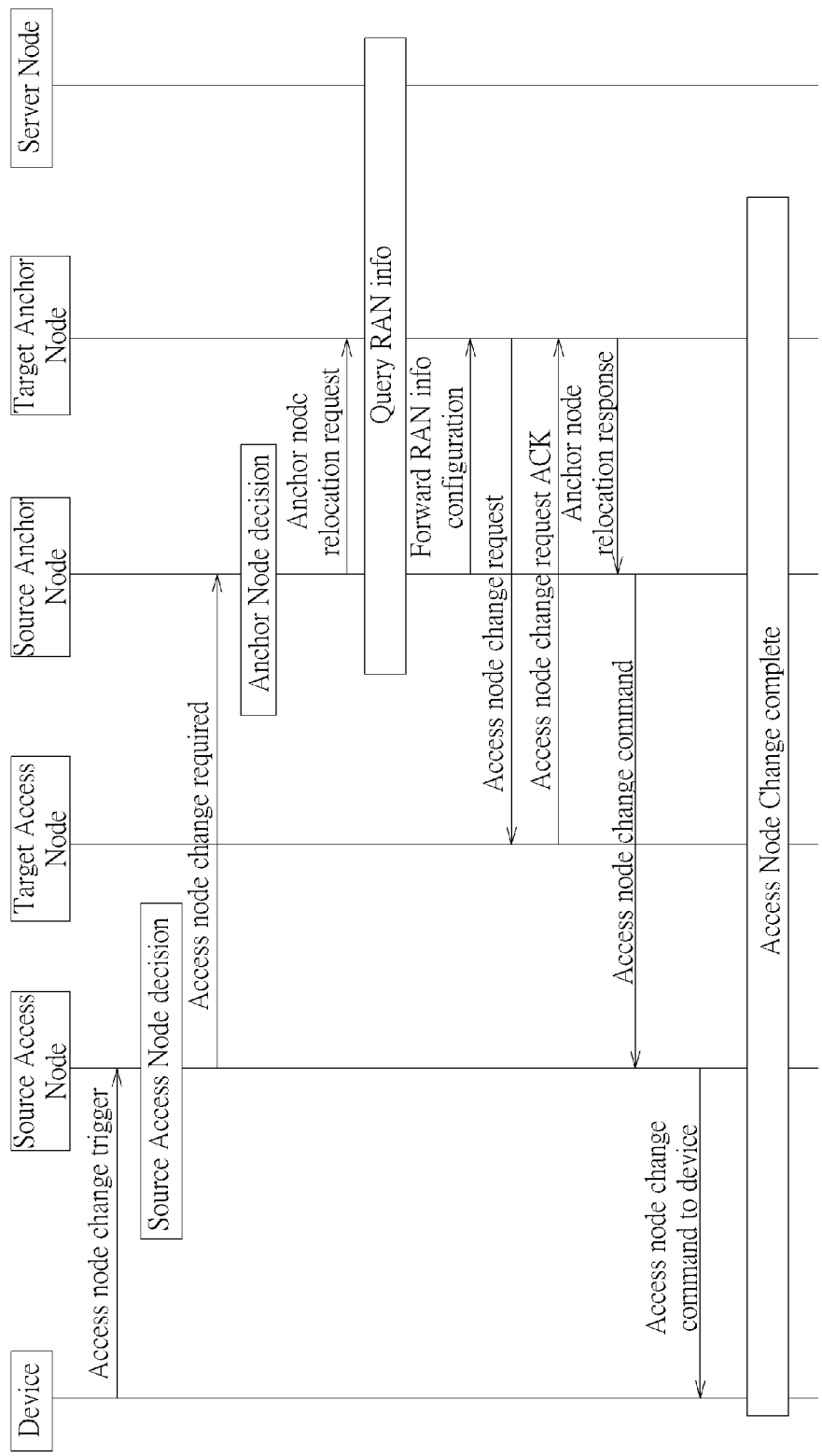

In FIG. 20, the device served by the source access node is moving from the service coverage of the source access node to the service coverage of the target access node. The source access node receives an access node change trigger message from the device and makes decision according to the information carried in the access node change trigger message. Then the source access node sends an access node change required message to the associated source anchor node. The source anchor node received an access node change required message makes decision according to the information carried in the message. Then the source anchor node sends an anchor node relocation request message to the target anchor node. The source anchor node may query the associated server node for RAN info if necessary. The source anchor node then sends a forward RAN info configuration message with RAN info to the target anchor node. The target anchor node sends an access node change request message with RAN info to the target access node to request for changing the access node of the device from the source access node to the target access node. When the target access node receives an access node change request message from the anchor node, the target access node sends an access node change request ACK message to the anchor node. When the target anchor node receives from the target access node an access node change request ACK message which associated with an access node change request message issued from the target anchor node to the target access node, the target anchor node sends an anchor node relocation response message with RAN info to the source anchor node. The source anchor node received an anchor node relocation response message associated with an anchor node relocation request message which was issued by the source anchor node, sends an access node change command message with RAN info to the associated source access node. When the source access node receives from the anchor node an access node change command message with RAN info, and the access node change command message associated with an access node change required message which was issued by the source access node to the anchor node, the source access node sends an access node change command to device message with RAN info to the device which issued the associated access node change trigger message. Then the access node change complete procedure is performed.

The forward RAN info configuration message is used by the source anchor node to forward the RAN info to the target anchor node, and may include applied RAN assistance information, applied RAN rules; RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells and supported RAN rules and RAN assistance information sets of other cells.

Figure 21:
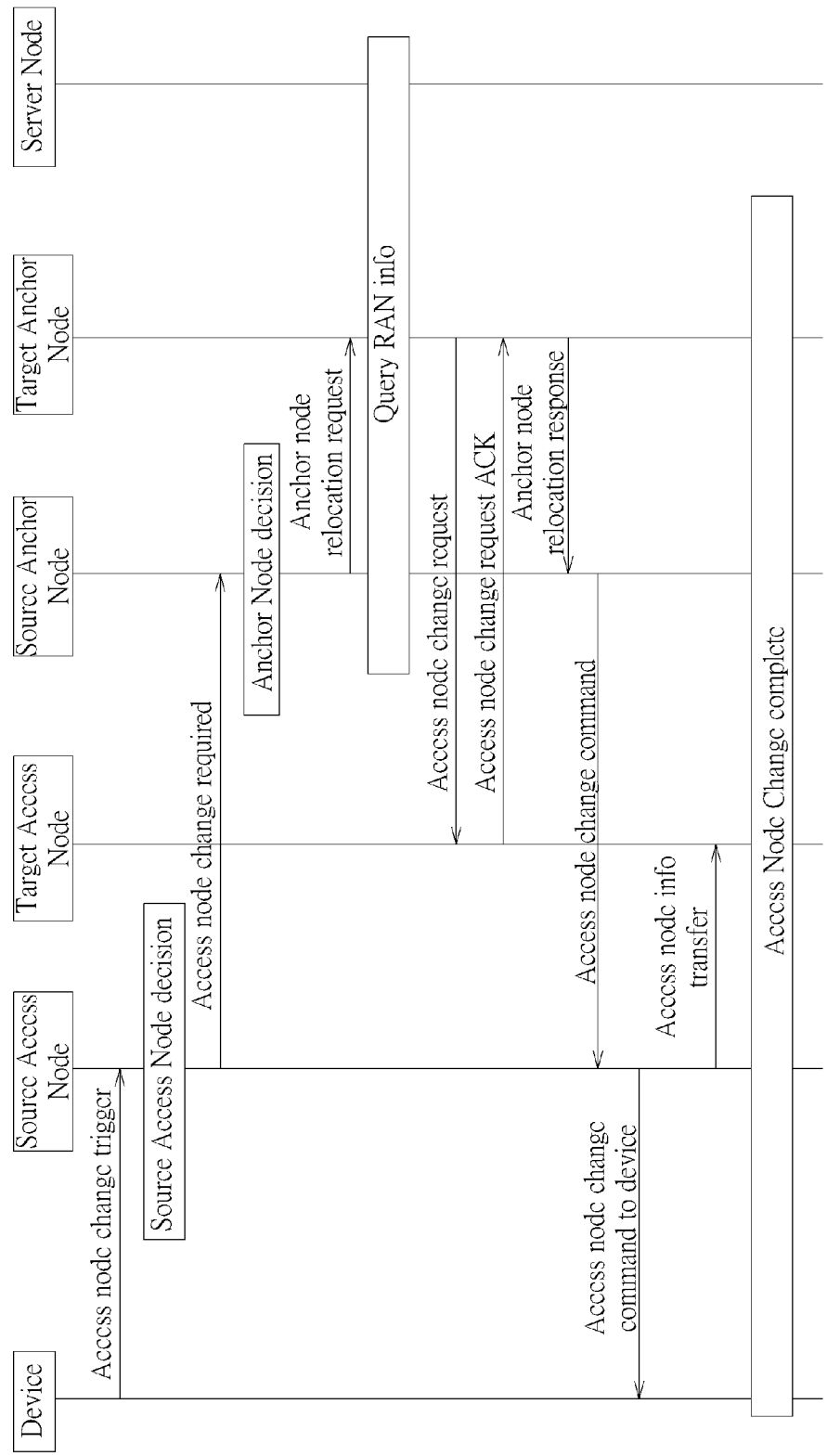

In FIG. 21, the device served by the source access node is moving from the service coverage of the source access node to the service coverage of the target access node. The source access node receives an access node change trigger message from the device and makes decision according to the information carried in the access node change trigger message. Then the source access node sends an access node change required message to the associated source anchor node. The source anchor node received an access node change required message makes decision according to the information carried in the message. Then the source anchor node sends an anchor node relocation request message to the target anchor node. The source anchor node may decide to query the associated server node for RAN info if necessary. The target anchor node received an anchor node relocation request message sends an access node change request message to the target access node to request for changing the access node of the device from the source access node to the target access node. The target access node received an access node change request message from the anchor node sends an access node change request ACK message to the anchor node. When the target anchor node receives from the target access node an access node change request ACK message which associated with an access node change request message issued from the target anchor node to the target access node, the target anchor node sends an anchor node relocation response message to the source anchor node. The source anchor node received an anchor node relocation response message associated with an anchor node relocation request message which was issued by the source anchor node, sends an access node change command message with RAN info to the associated source access node. When the source access node receives from the anchor node an access node change command message with RAN info, and the access node change command message associated with an access node change required message which was issued by the source access node to the anchor node, the source access node sends an access node change command to device message with RAN info to the device which issued the associated access node change trigger message. The source access node sends an access node info transfer message with RAN info to the target access node. Then the access node change complete procedure is performed.

Figure 22:
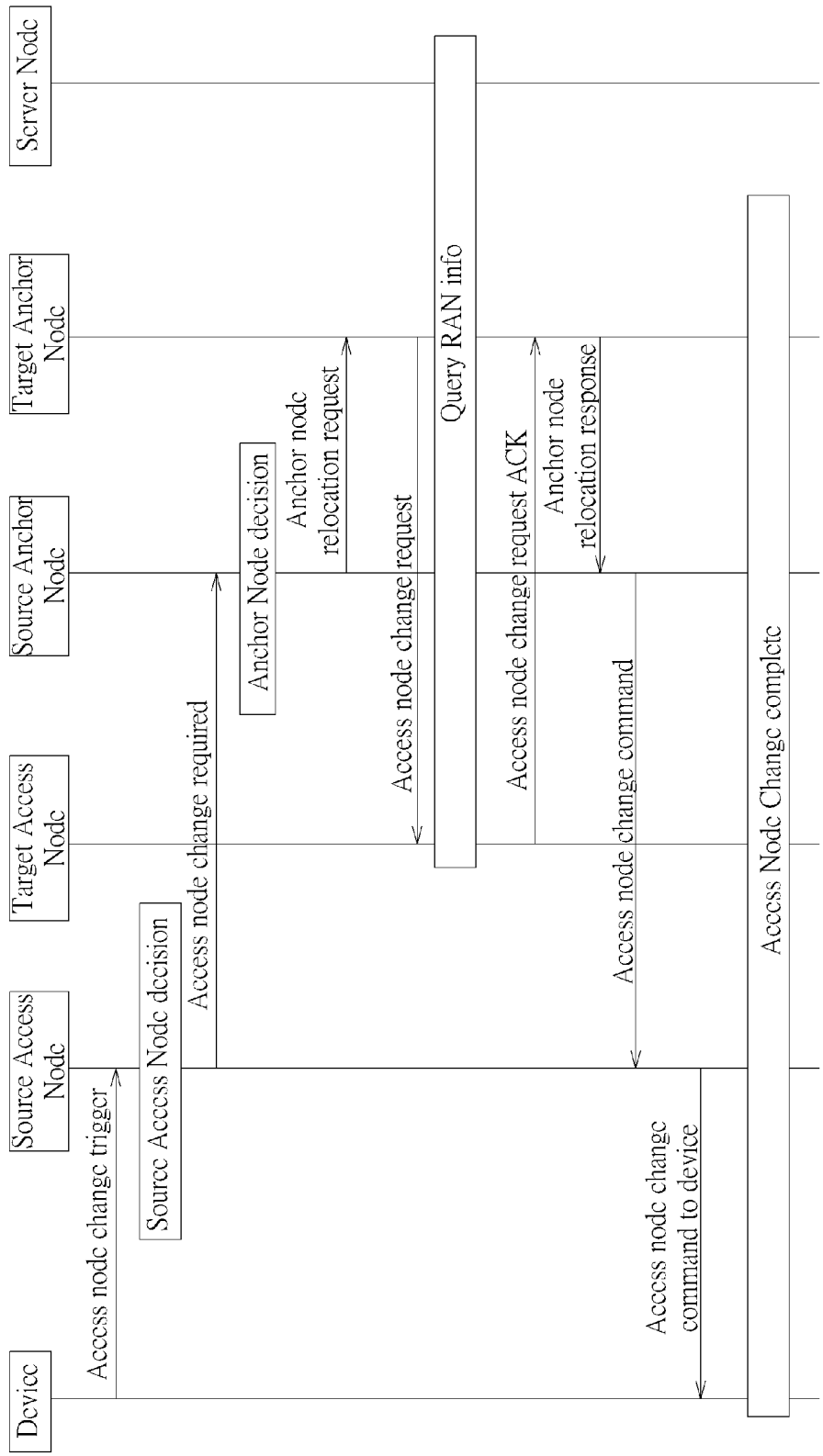

In FIG. 22, the device served by the source access node is moving from the service coverage of the source access node to the service coverage of the target access node. The source access node receives an access node change trigger message from the device and makes decision according to the information carried in the access node change trigger message. Then the source access node sends an access node change required message to the associated source anchor node. The source anchor node received an access node change required message makes decision according to the information carried in the message. Then the source anchor node sends an anchor node relocation request message to the target anchor node. The target anchor node received an anchor node relocation request message sends an access node change request message to the target access node to request for changing the access node of the device from the source access node to the target access node. The target access node received an access node change request message from the target anchor node may query the associated server node for RAN info if necessary. The target access node sends an access node change request ACK message with RAN info to the target anchor node. When the target anchor node receives from the target access node an access node change request ACK message with RAN info, and the access node change request ACK message associated with an access node change request message issued from the target anchor node to the target access node, the target anchor node sends an anchor node relocation response message with RAN info to the source anchor node. The source anchor node received an anchor node relocation response message with RAN info, and the anchor node relocation response message associated with an anchor node relocation request message which was issued by the source anchor node, the source anchor node sends an access node change command message with RAN info to the associated source access node. When the source access node receives from the anchor node an access node change command message with RAN info, and the access node change command message associated with an access node change required message which was issued by the source access node to the anchor node, the source access node sends an access node change command to device message with RAN info to the device which issued the associated access node change trigger message. Then the access node change complete procedure is performed.

Figure 23:
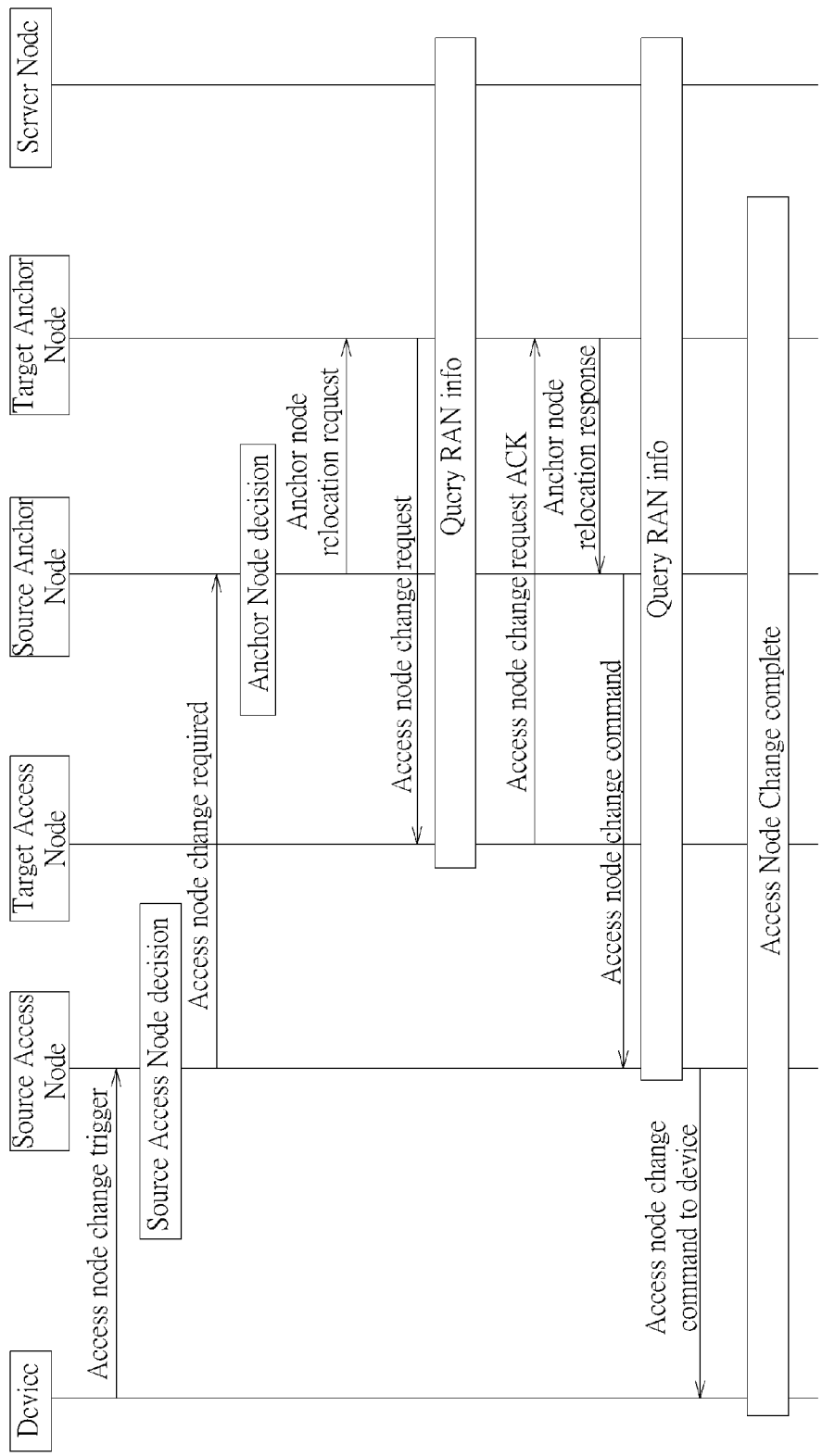

In FIG. 23, the device served by the source access node is moving from the service coverage of the source access node to the service coverage of the target access node. The source access node receives an access node change trigger message from the device and makes decision according to the information carried in the access node change trigger message. Then the source access node sends an access node change required message to the associated source anchor node. The source anchor node received an access node change required message makes decision according to the information carried in the message. Then the source anchor node sends an anchor node relocation request message to the target anchor node. The target anchor node sends an access node change request message to the target access node to request for changing the access node of the device from the source access node to the target access node. The target access node received an access node change request message from the target anchor node may query the associated server node for RAN info if necessary. The target access node sends an access node change request ACK message to the target anchor node. When the target anchor node receives from the target access node an access node change request ACK message which associated with an access node change request message issued from the target anchor node to the target access node, the target anchor node sends an anchor node relocation response message to the source anchor node. The source anchor node received an anchor node relocation response message associated with an anchor node relocation request message which was issued by the source anchor node, sends an access node change command message to the associated source access node. When the source access node receives from the anchor node an access node change command message associated with an access node change required message which was issued by the source access node to the anchor node, the source access node may query the associated server node for RAN info if necessary. The source access node sends an access node change command to device message with RAN info to the device which issued the associated access node change trigger message. Then the access node change complete procedure is performed.

Figure 24:
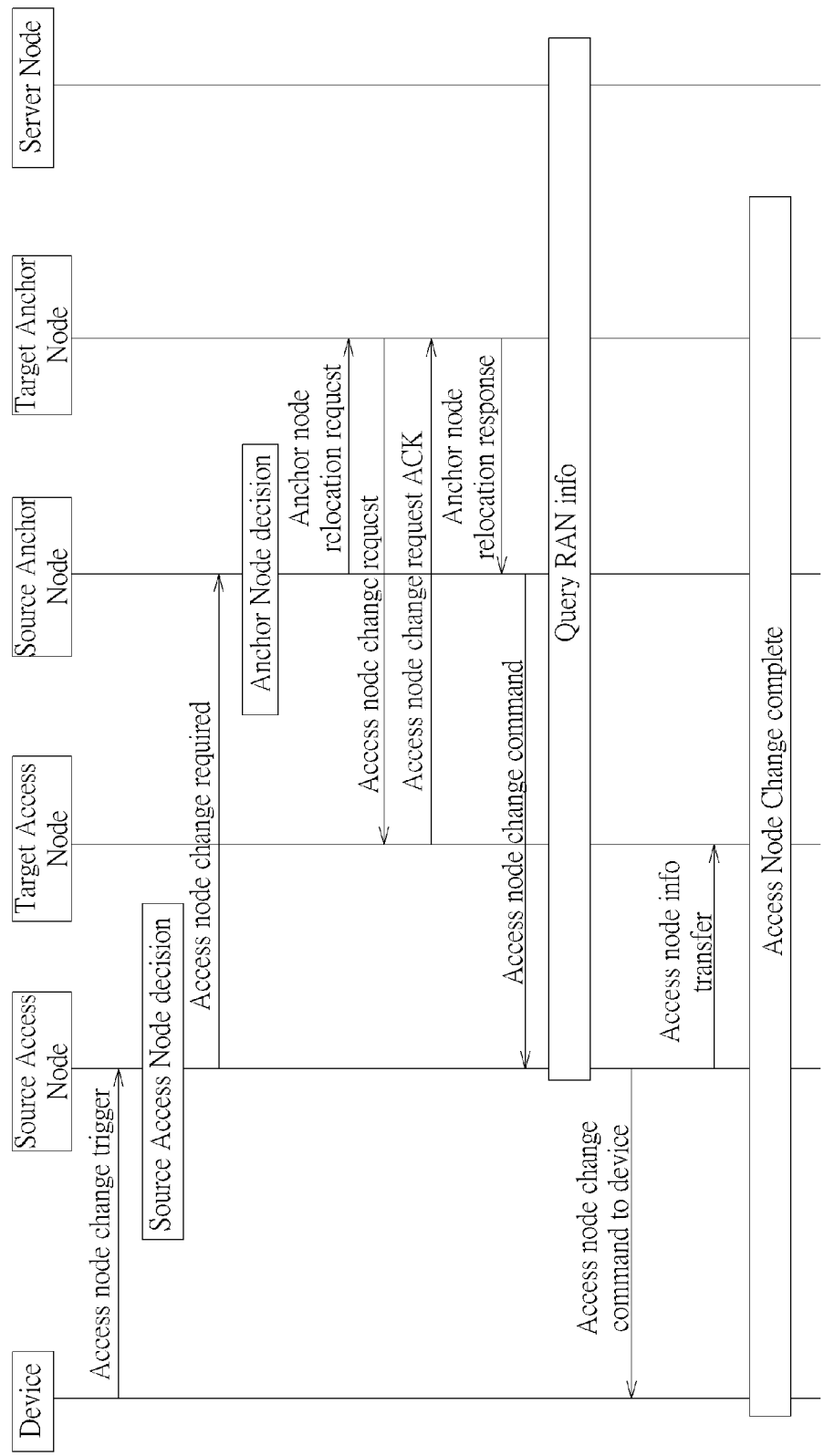

In FIG. 24, the device served by the source access node is moving from the service coverage of the source access node to the service coverage of the target access node. The source access node receives an access node change trigger message from the device and makes decision according to the information carried in the access node change trigger message. Then the source access node sends an access node change required message to the associated source anchor node. The source anchor node received an access node change required message makes decision according to the information carried in the message. Then the source anchor node sends an anchor node relocation request message to the target anchor node. The target anchor node received an anchor node relocation request message sends an access node change request message to the target access node to request for changing the access node of the device from the source access node to the target access node. The target access node received an access node change request message from the target anchor node sends an access node change request ACK message to the target anchor node. When the target anchor node receives from the target access node an access node change request ACK message which associated with an access node change request message issued from the target anchor node to the target access node, the target anchor node sends an anchor node relocation response message to the associated source anchor node. The source anchor node received an anchor node relocation response message associated with an anchor node relocation request message which was issued by the source anchor node, sends an access node change command message to the associated source access node. When the source access node receives from the anchor node an access node change command message associated with an access node change required message which was issued by the source access node to the anchor node, the source access node may query the associated server node for RAN info if necessary. The source access node sends an access node change command to device message with RAN info to the device which issued the associated access node change trigger message. The source access node sends an access node info transfer message with RAN info to the target access node. Then the access node change complete procedure is performed.

Figure 25:
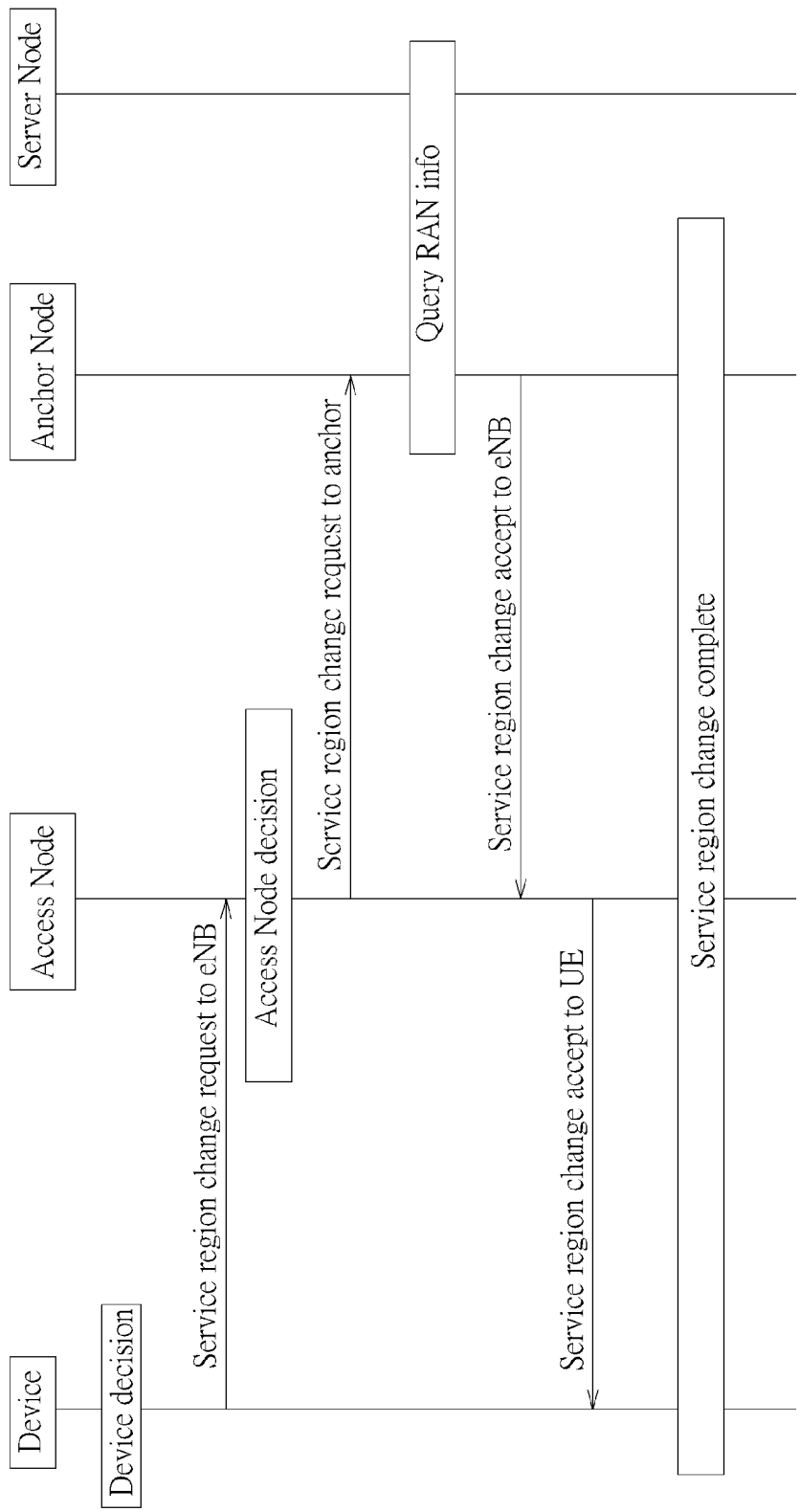
FIGS. 25-26 illustrate a message flow of an area update procedure for RAN info update.
Figure 26:
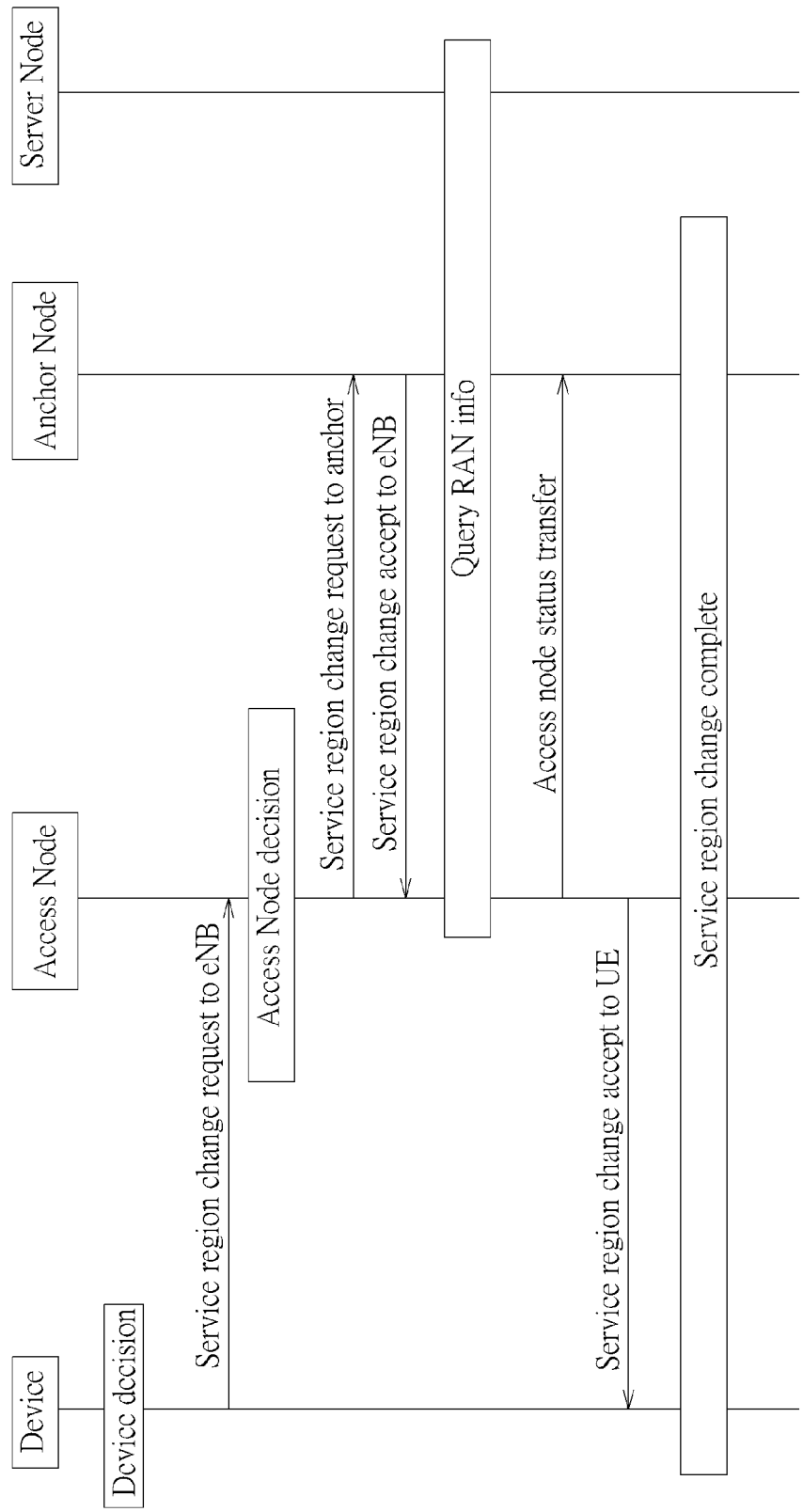

FIGS. 25-26 illustrate a message flow of an area update procedure for RAN info update. In FIG. 25, the device served by the access node performs service region change procedure to update the latest service region information to the service network. The device sends a service region change request to eNB message to the access node to initiate the service region change procedure. The access node receives a service region change request to eNB message from the device and makes decision according to the information carried in the service region change request to eNB message. Then the access node sends a service region change request to anchor message to the associated anchor node. The anchor node received a service region change request to anchor message may query the associated server node for RAN info if necessary. The anchor node sends a service region change accept to eNB message with RAN info to the associated access node. When the access node receives from an anchor node a service region change accept to eNB message with RAN info, and the service region change accept to eNB message associated with a service region change request to anchor message the access node issued to the anchor node, the access node sends a service region change accept to UE message with RAN info to the device which issued the associated service region change request to eNB message. When the device receives from the access node a service region change accept to UE message which associated with a service region change request to eNB message the device issued to the access node, the service region change complete procedure is performed.

The service region change request to eNB message may include indicator of interworking preference (e.g., offload preference, RAT preference), indicator of the cause of request (e.g., request for RAN assistance information), indicator of the capability to support RAN rules, indicator of the capability to support RAN assistance information, capability of supported 3GPP release, capability of supported RAN rules, capability of supported RAN assistance information, capability of supported RAN rules and RAN assistance information sets, protocol discriminator; security header type, tracking area update request message identity, EPS update type, NAS key set identifier and Old GUTI.

The service region change request to anchor message may include indicator of interworking preference (e.g., offload preference, RAT preference), indicator of the cause of request (e.g., request for RAN assistance information), indicator of the capability to support RAN rules, indicator of the capability to support RAN assistance information, capability of supported 3GPP release, capability of supported RAN rules, capability of supported RAN assistance information; capability of supported RAN rules and RAN assistance information sets, protocol discriminator, security header type, tracking area update request message identity, EPS update type, NAS key set identifier; Old GUTI.

The service region change accept to eNB message may include applied RAN assistance information, applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells, supported RAN rules and RAN assistance information sets of other cells, protocol discriminator, security header type, tracking area update accept message identity, EPS update result and spare half octet.

The service region change accept to UE message may include applied RAN assistance information, applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells, supported RAN rules and RAN assistance information sets of other cells, protocol discriminator, security header type, tracking area update accept message identity, EPS update result and spare half octet.

In FIG. 26, the device served by an access node decides to perform service region change procedure to update the latest service region information to the service network. The device sends a service region change request to eNB message to the access node to initiate the service region change procedure. The access node receives a service region change request to eNB message from the device and makes decision according to the information carried in the service region change request to eNB message. Then the access node sends a service region change request to anchor message to the associated anchor node. The anchor node received a service region change request to anchor message from an access node sends a service region change accept to eNB message to the access node. When an access node receives from an anchor node a service region change accept to eNB message which associated with a service region change request to anchor message the access node issued to the anchor node, the access node may query the associated server node for RAN info if necessary. The access node sends an access node status transfer message with RAN info to the associated anchor node. The access node sends a service region change accept to UE message with RAN info to the associated device. When the device receives from the access node a service region change accept to UE message which associated with a service region change request to eNB message the device issued to the access node, the service region change complete procedure is performed.

The access node status transfer message may include applied RAN assistance information, applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells, supported RAN rules and RAN assistance information sets of other cells.

Figure 27:
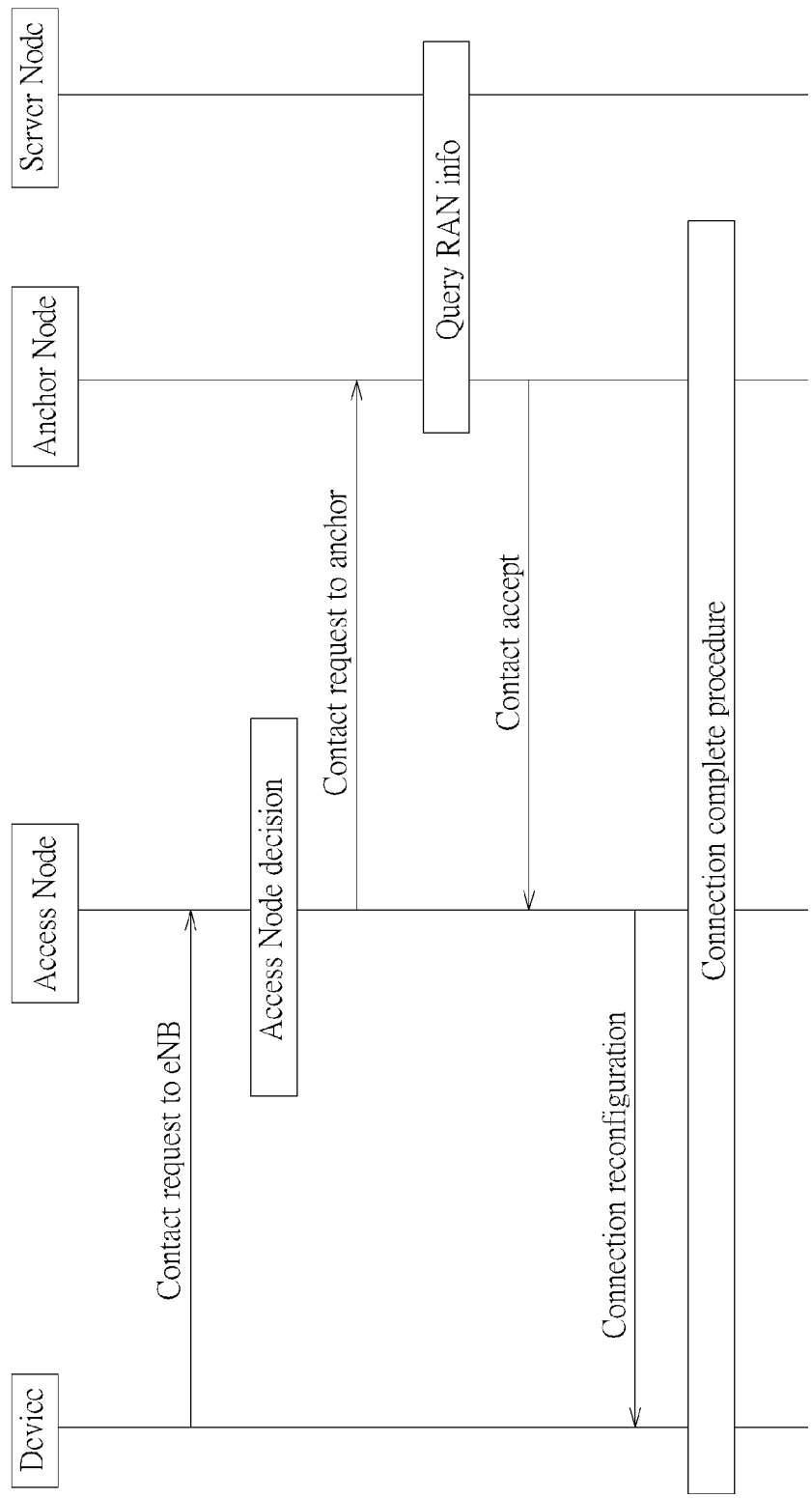
FIGS. 27-28 illustrate a message flow of an attach procedure for RAN info update.
Figure 28:
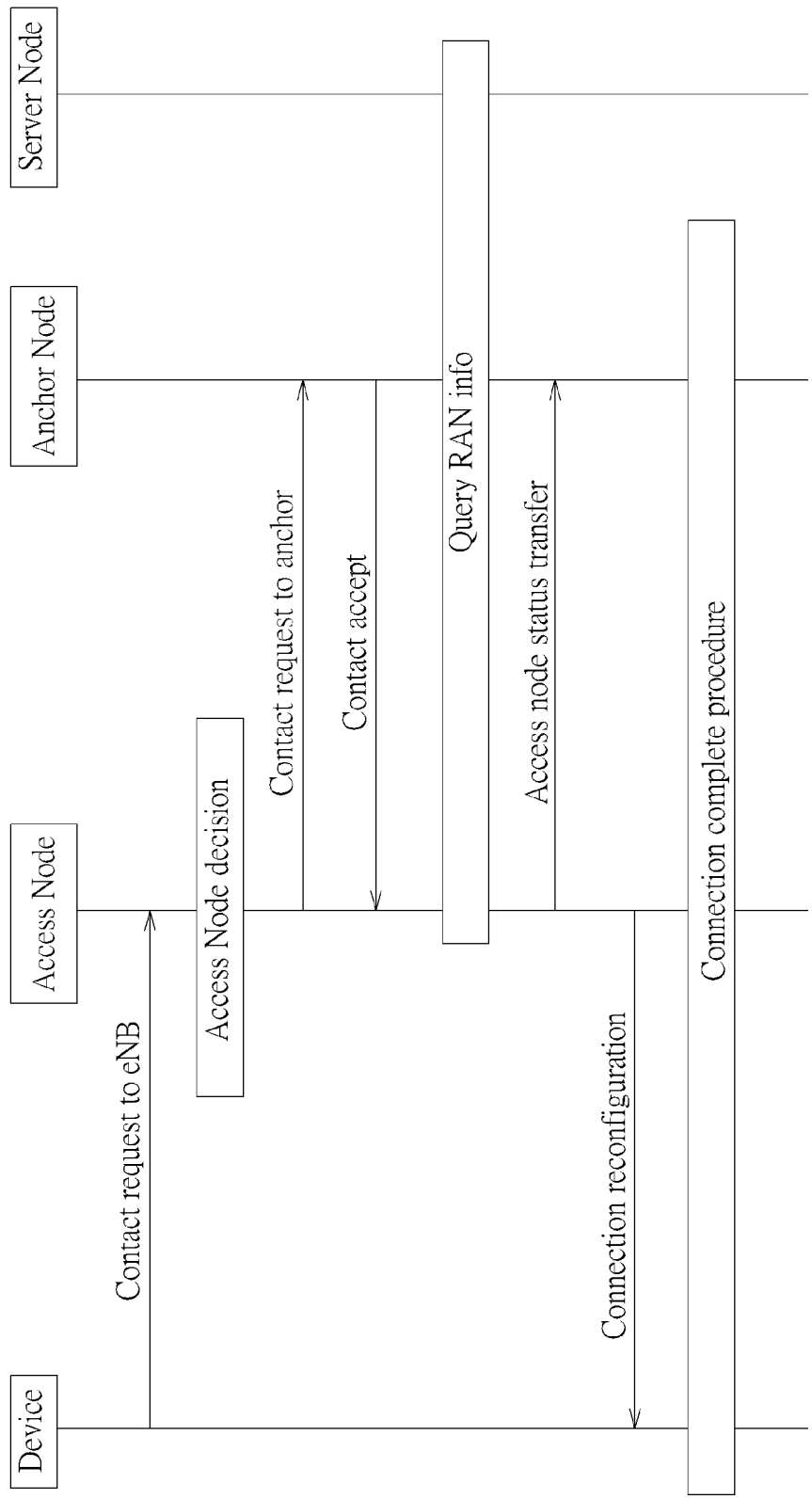

FIGS. 27-28 illustrate a message flow of an attach procedure for RAN info update. In FIG. 27, the device decides to contact the network to obtain network service. The device sends a contact request to eNB message to the access node. The access node receives a contact request to eNB message from the device and makes decision according to the information carried in the contact request to eNB message. Then the access node sends a contact request to anchor message to the associated anchor node. The anchor node received a contact request to anchor message from the access node may query the associated server node for RAN info if necessary. The anchor node sends a contact accept message with RAN info to the access node. When the access node receives from an anchor node a contact accept message with RAN info, and the contact accept message is associated with a contact request to anchor message the access node issued to the anchor node, the access node sends a connection reconfiguration message with RAN info to the associated device. When the device receives from the access node a connection reconfiguration message which associated with a contact request to eNB message that issued from the device to the access node, the connection complete procedure is performed.

The contact request to eNB B message may include indicator of interworking preference (e.g., offload preference, RAT preference), indicator of the cause of request (e.g., request for RAN assistance information), indicator of the capability to support RAN rules, indicator of the capability to support RAN assistance information, capability of supported 3GPP release, capability of supported RAN rules, capability of supported RAN assistance information, capability of supported RAN rules and RAN assistance information sets, protocol discriminator, security header type, attach request message identity, EPS attach type, NAS key set identifier, EPS mobile identity, UE network capability and ESM message container.

The contact request to anchor message may include indicator of interworking preference (e.g., offload preference, RAT preference), indicator of the cause of request (e.g., request for RAN assistance information), indicator of the capability to support RAN rules, indicator of the capability to support RAN assistance information, capability of supported 3GPP release, capability of supported RAN rules, capability of supported RAN assistance information, capability of supported RAN rules and RAN assistance information sets, protocol discriminator, security header type; attach request message identity, EPS attach type, NAS key set identifier, EPS mobile identity, UE network capability, ESM message container.

The contact accept message may include applied RAN assistance information, applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells, supported RAN rules and RAN assistance information sets of other cells, protocol discriminator; security header type, attach accept message identity, EPS attach result, spare half octet, T3412 value, TAI list and ESM message container.

The connection reconfiguration message may include applied RAN assistance information, applied RAN rules, RAN assistance information, RAN rules, the configuration of RAN rules sets, the configuration of RAN assistance information sets, the configuration of RAN rules and RAN assistance information sets, supported RAN rule sets of other cells, supported RAN assistance information sets of other cells, supported RAN rules and RAN assistance information sets of other cells, rrc-TransacionIdentifier, critical Extensions and SecurityConfigHO.

In FIG. 28, the device decides to contact the network to obtain network service. The device sends a contact request to eNB message to the access node. The access node receives a contact request to eNB message from the device and makes decision according to the information carried in the contact request to eNB message. Then the access node sends a contact request to anchor message to the associated anchor node. The anchor node received a contact request to anchor message from the access node sends a contact accept message to the access node. When the access node receives from an anchor node a contact accept message which associated with a contact request to anchor message the access node issued to the anchor node, the access node may query the associated server node for RAN info if necessary. The access node then may send the access node status transfer message with RAN info to the anchor node. The access node sends a connection reconfiguration message with RAN info to the associated device. When the device receives from the access node a connection reconfiguration message which associated with a contact request to eNB message the device issued to the access node, the connection complete procedure is performed.

As can be seen, by including new information elements in the signaling/message of the access stratum procedure, handover procedure, area update procedure, attach procedure. The access nodes, server node and device can query and obtain RAN info for update.

In order to include RAN assistance information and RAN rules in the signaling or the abovementioned message of the access stratum procedure, handover procedure, area update procedure and attach procedure, the present invention provides a set design for the RAN rules and RAN assistance information for reducing the amount of data (i.e. RAN info).

Set design is illustrated as follows. The RAN assistance information (hereafter called RAI) includes parameters, which are grouped into RAI sets. For example, the parameters may include threshDIBackhaulRateLow, threshRsrpLow, threshOffloadPreference, threshBSSLoadHigh, threshRsrpHigh, and threshRsrqLow. A RAI set can be identified with a RAI set number. The Server node may maintain RAI sets and may send configure of RAI sets to the device. The RAI sets may be stored in the device. In addition, the access node may support some of RAI sets.

In addition, each parameter of RAN assistance information may be associated to a value. FIG. 29 illustrates a first example of configuration of RAI sets. RAN assistance information includes four parameters, i.e., Parameter1, Parameter2, Parameter3, and Parameter4, which are grouped into 16 RAI sets, i.e. RAI Set1-RAI Set16. Four binary bits are used to present whether parameters are included in the RAI set. RAI set1 is presented as {1,1,1,0}, which means Parameter1, Parameter2, and Parameter3 are included in RAI set1, but no Parameter4 in RAI set1.

FIG. 30 illustrates a second example of configuration of RAI sets. RAN assistance information includes four parameters, i.e., Parameter1, Parameter2, Parameter3, and Parameter4, which are grouped into 16 RAI sets. Four binary bits are used to present whether parameters are included in the RAI set. For example, {1,1,1,0} is presented that Parameter1, Parameter2, and Parameter3 are included in RAI set.

Figure 31:
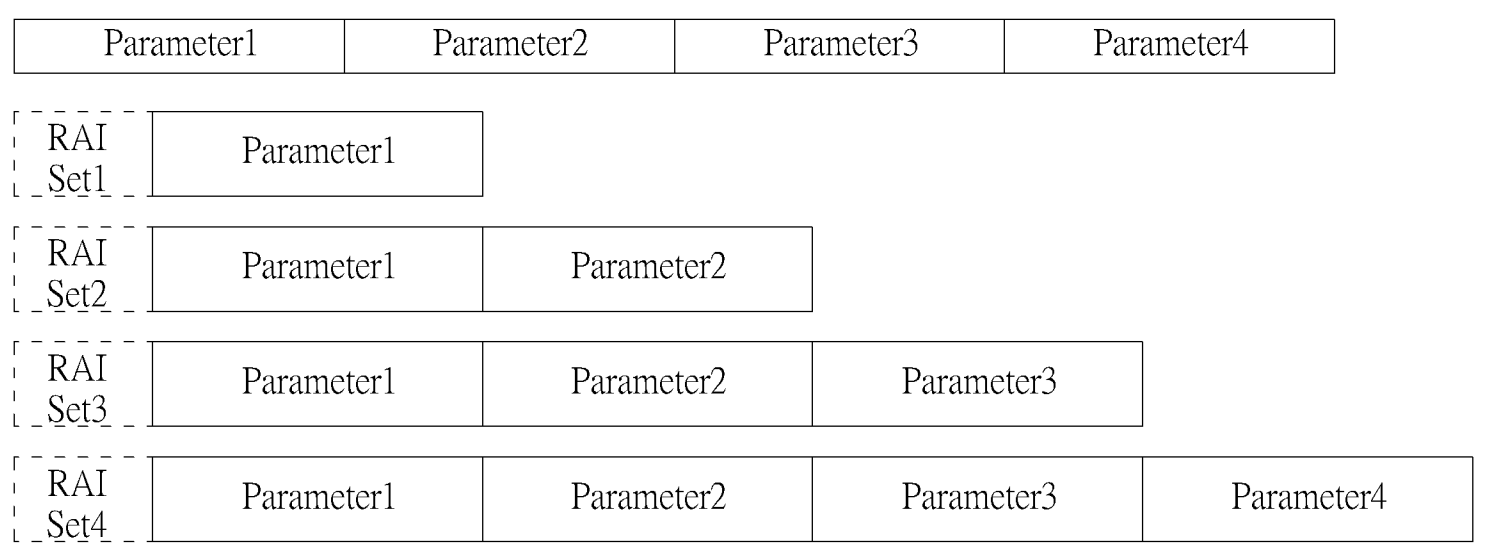

FIG. 31 illustrates a third example of configuration of RAI sets. Similarly, there are four parameters, i.e. parameter1, parameter2, parameter3, and parameter4, which are grouped into 4 RAI sets and each RAI set has an associated set identity, i.e. RAI Set1-RAI Set4. RAI Set1 includes Parameter1. RAI Set2 includes Parameter1 and Parameter2. RAI Set3 includes Parameter1, Parameter2, and Parameter3. RAI Set4 includes Parameter1, Parameter2, Parameter3, and Parameter4.

With the same manner, RAN rules (hereafter called RRs) could be presented in a set design. In other words, RAN rules can be grouped into RR sets. RAN rules may comprise (1) "IARP for NSWO" rule: Route YouTube traffic directly to WLAN if the WLAN's backhaul rate is greater to threshDIBackhaulRateLow; (2) "IARP for APN" rule: Route Skype traffic to APN-x if the WLAN's BSS load exceeds threshBssLoadHigh; (3) "ISMP" rule: Prefer EPC access over WLAN if measured RSRP<threshRsrpLow; (4) "ISMP" rule: Prefer EPC access over 3GPP if offloadpreference<threshoOffloadPreference and measured RSRP>threshRsrpHigh; (5) "ISRP for IFOM" rule: Route UDP/RTP flows to WLAN if Offload preference>=threshOffloadPreference; (6) "WLANSP" rule: Select a WLAN that interworks with partner1.com if the WLAN's backhaul rate>=threshDIBackhaulRateLow and measured RSRQ<threshRsrqLow; and (7) "ISMP" rule: Prefer EPC access over WLAN if offload preference>=threshOffloadPreference. A RR set can be identified with a RR set number. The Server node maintains RR sets and may send the configuration of RR sets to the device. RR sets may be stored in devices. In addition, the access node may support some of RR sets.

Figure 32:
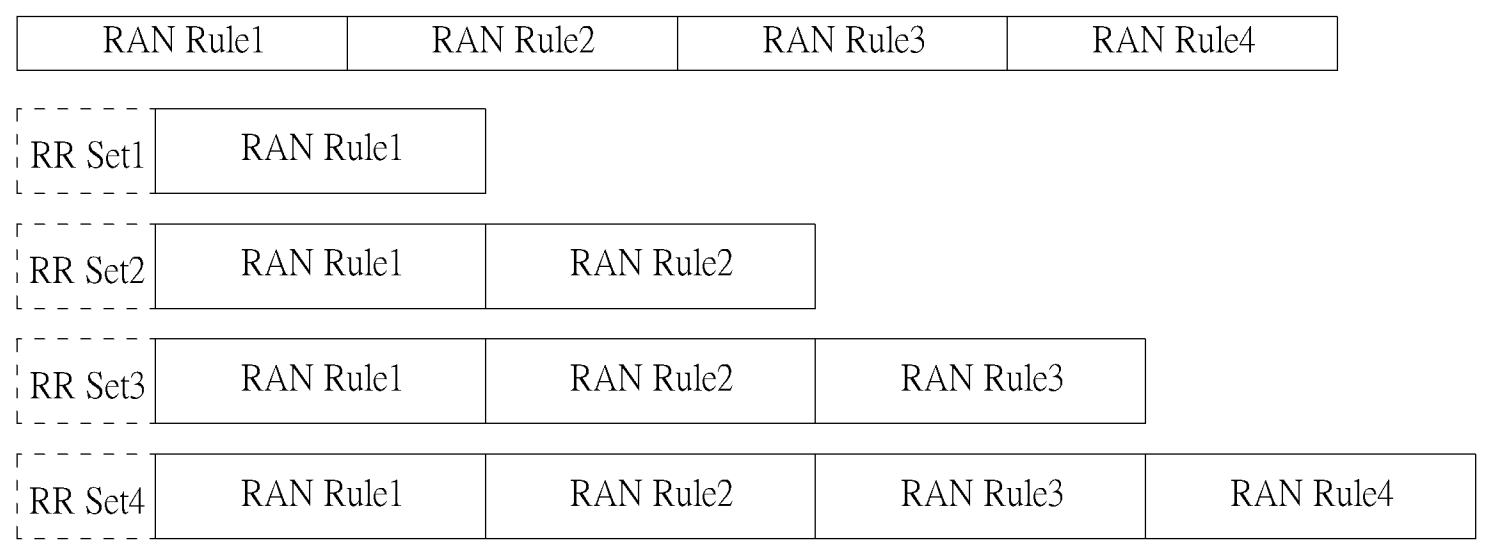

FIG. 32 illustrates a first example of configuration of RR sets. There are four RAN rules, i.e., RAN Rule1, RAN Rule2, RAN Rule3, and RAN Rule4, which are grouped into 4 RR sets, i.e., RR Set1-RR Set4. RR Set1 includes RAN Rule1. RR Set2 includes RAN Rule1 and RAN Rule2. RR Set3 includes RAN Rule1, RAN Rule2, and RAN Rule3. RR Set4 includes RAN Rule1, RAN Rule2, RAN Rule3, and RAN Rule4.

FIG. 33 illustrates a second example of configuration of RR sets. There are four RAN Rules, i.e., RAN Rule1, RAN Rule2, RAN Rule3, and RAN Rule4, which are grouped into 16 RR sets, i.e., RR Set1-RR Set16. Four binary bits are used to present whether RAN rules are included in the RR set. RR set 1 is presented as {1,1,1,0}, which means RAN Rule1, RAN Rule2, and RAN Rule3 are included in RR set1.

FIG. 34 illustrates a third example of configuration of RR sets. There are four RAN Rules, i.e., RAN Rule1, RAN Rule2, RAN Rule3, and RAN Rule4, which are grouped into 16 RR sets. Four binary bits are used to present whether RAN rules are included in the RR set. {1,1,1,0} is presented that RAN Rule1, RAN Rule2, and RAN Rule3 are included in the set.

In an embodiment, RAN rules and RAN assistance information (hereafter called RnR) could be presented in a set design. RAN rules and RAN assistance information can be grouped into RnR sets. A RnR set can be identified by a RnR set number. The server node maintains RnR sets and may send the configuration to the device. The RnR sets may be stored in the devices. In addition, the access node may support some of RnR sets.

FIG. 35 illustrates a first example of configuration of RnR sets. Two parameters and two RAN rules, i.e. Parameter1, Parameter2, RAN Rule1, and RAN Rule2, are grouped into 16 RnR sets and each RnR set has an associated set identity, i.e. RnR Set1-RnR Set16. Four binary bits are used to present whether parameters and RAN rules are included in the RnR set. RnR set1 is presented as {1,1,1,1}, which means Parameter1, Parameter2, RAN Rule1 and RAN Rule2 are included in RnR set1.

FIG. 36 illustrates a second example of configuration of RnR sets. Two parameters and two RAN rules, i.e. Parameter1, Parameter2, RAN Rule1, and RAN Rule2, are grouped into 16 RnR sets. Four binary bits are used to present whether parameters and RAN rules are included in the RnR set. {1,1,1,1} is presented that Parameter1, Parameter2, RAN Rule1 and RAN Rule2 are included in the set.

Figure 37:
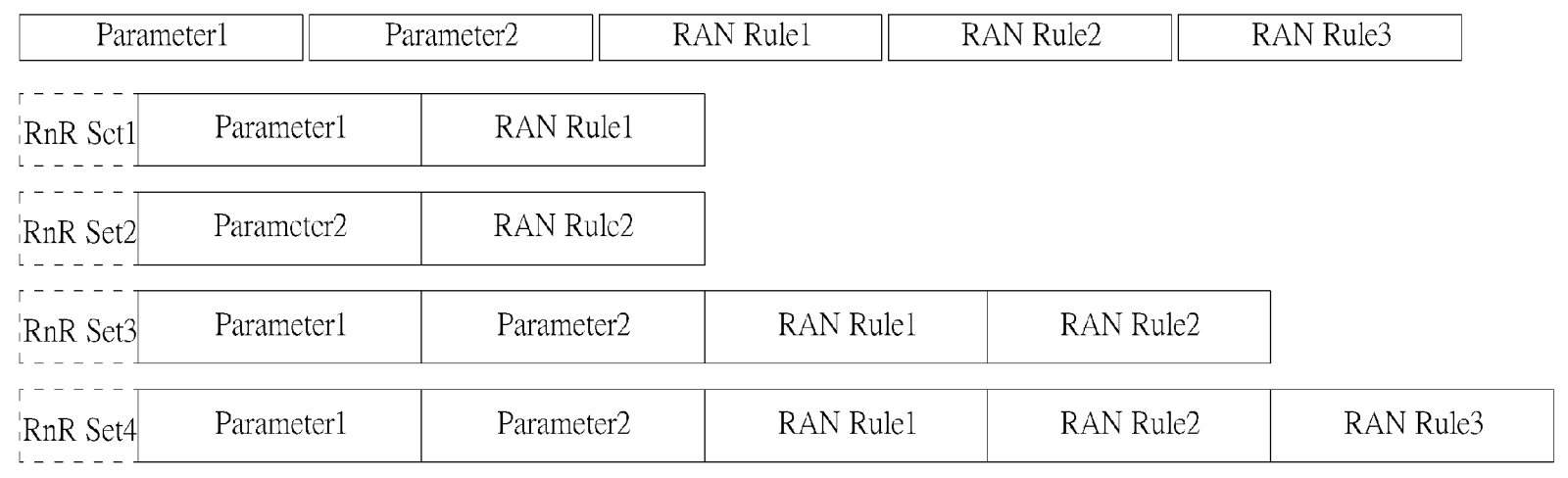

FIG. 37 illustrates a third example of configuration of RnR sets. Two parameters and two RAN rules, i.e. Parameter1, Parameter2, RAN Rule1, RAN Rule2, and RAN Rule3, are grouped into 4 RnR sets and each RnR set has an associated set identity, i.e. RnR Set1-RnR Set4. RnR Set1 includes Parameter1 and RAN Rule1. RnR Set2 includes Parameter2 and RAN Rule2. RnR Set3 includes Parameter1, Parameter2, RAN Rule1, and RAN Rule2. RnR Set4 includes Parameter1, Parameter2, RAN Rule1, RAN Rule2, and RAN Rule3.

Based on the process 70 and the RAN info set design, RAN info (i.e. RAN assistance information and RAN rules) could be updated with set-based configuration in the abovementioned signaling/message of access stratum, handover, area update or attach procedure.

Besides, the access node may update the RAN info by providing the RAI set number/RR set number/RnR set number and values of a RAI set/RnR set to the device. Therefore, the device can apply the received values to the corresponding parameters of the RAI set/RnR set stored in the device or apply RAN rules in the RR set stored in the device.

Figure 38:
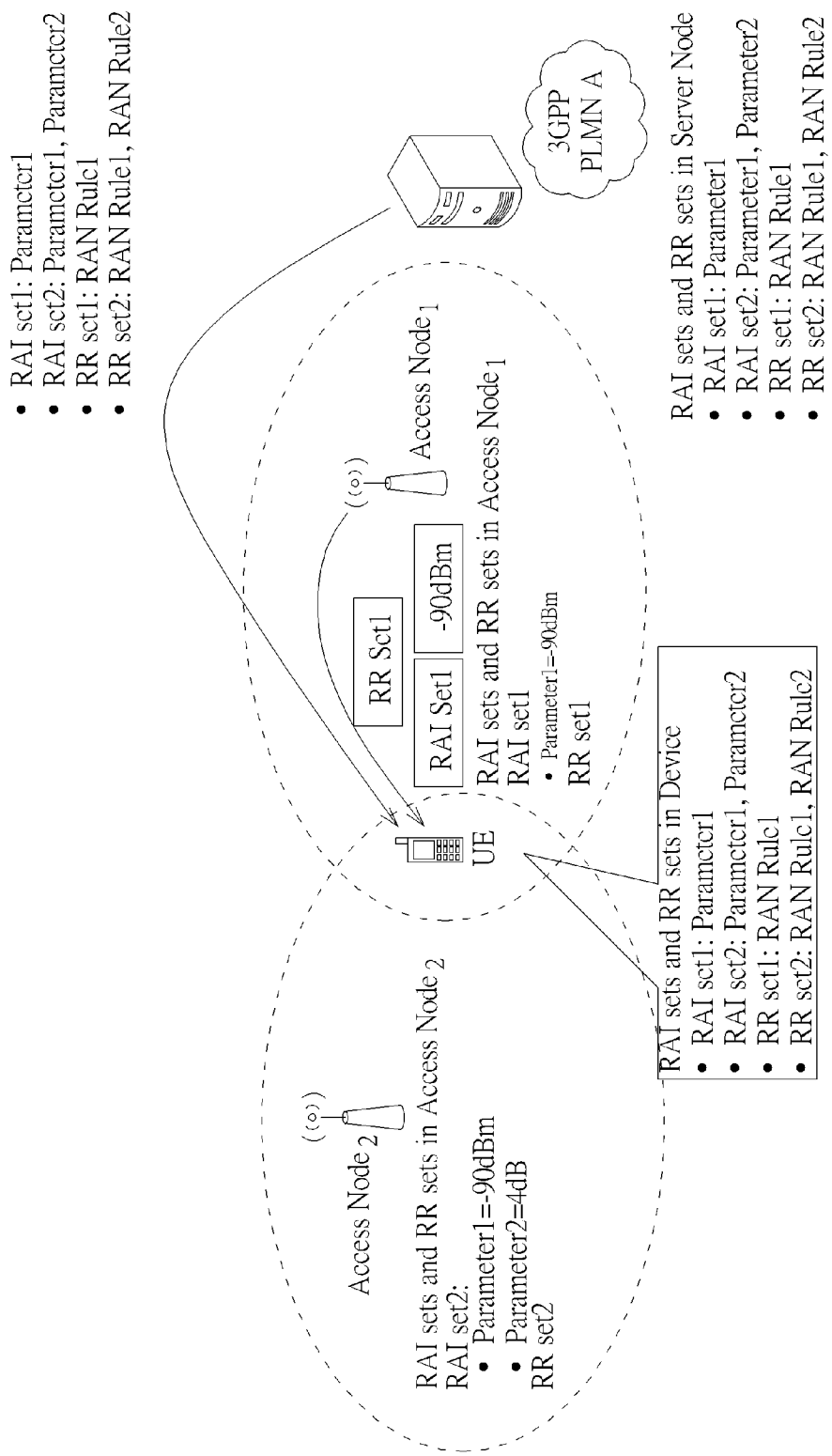
FIGS. 38-40 illustrate RAN info update operation according to the present disclosure.
Figure 39:
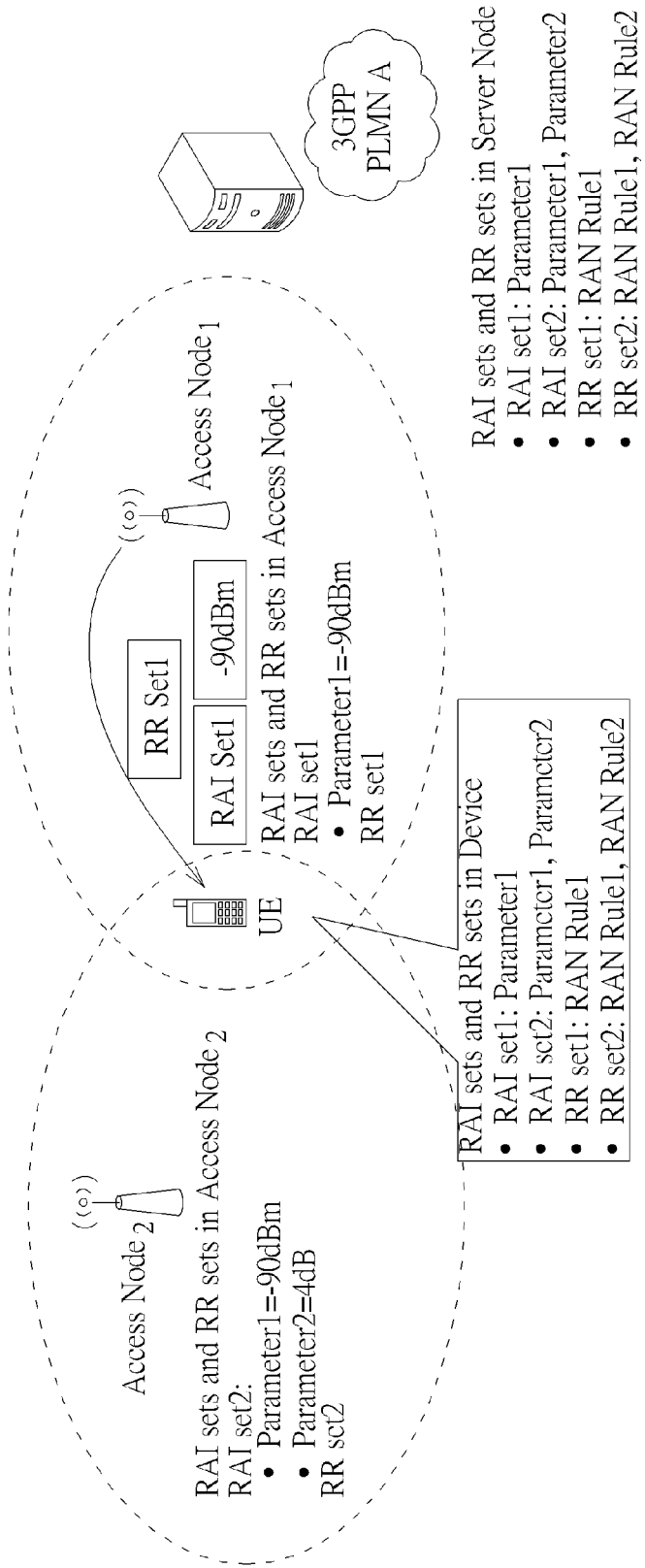
Figure 40:
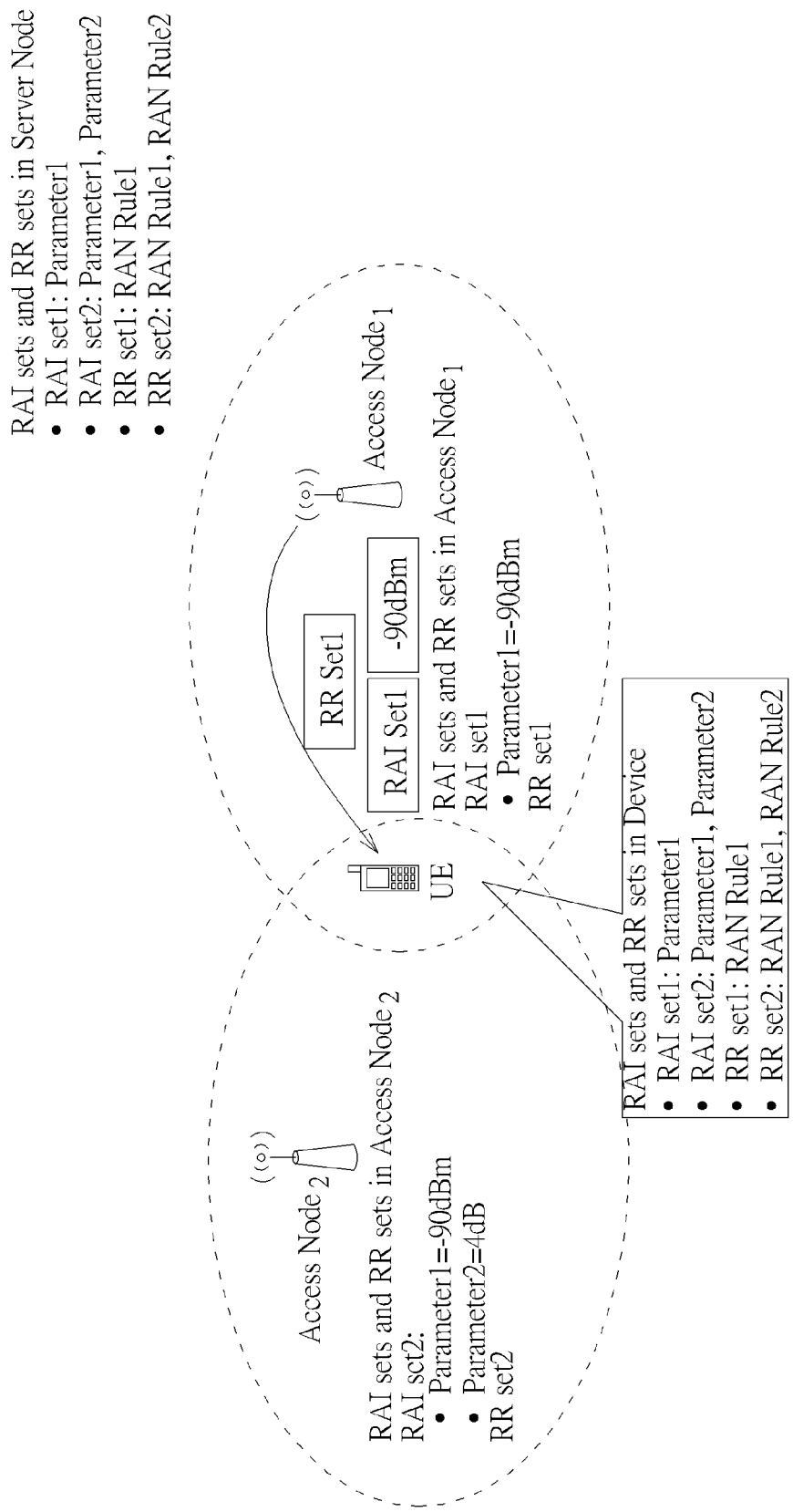

For detailed RAN info update operation, please refer to FIGS. 38-40. In FIG. 38, set-based RAI configuration/set-based RR configuration/set-based RnR configuration may be pre-configured in the server node of the PLMN. RAI set1 includes Parameter1. RAI set2 includes Parameter1 and Parameter2. RR set1 includes RAN Rule1. RR set2 includes RAN Rule1 and RAN Rule2. Sever node may provide RAI sets/RR sets/RnR sets to the device and access node1 and access node2. The device, access node1 and access node2 store the RAI sets/RR sets/RnR sets. Note that, RnR sets are not shown in FIG. 38-40 for simplicity, but applied with the same operation as RAI sets/RR sets. Access node1 may support RAN info update for RAI set1 and RR set1. Access node2 may support RAN info update for RAI set2 and RR set2. When the device moves close to the access node1, the access node1 may provide RAN info update to the device, i.e. RAI set1=−90 dBm and RR set1. On the other hand, when the device moves close to the access node2, the access node2 may provide RAN info update to device, i.e. RAI set2={−90 dBm, 4 dB} and RR set2.

In FIG. 39, set-based RAI configuration/set-based RR configuration/set-based RnR configuration is pre-configured in the server node and access nodes. The server node does not provide RAI sets, RR sets and RnR sets to the access node1 and access node2. Access node1 may support RAN info update for RAI set1 and RR set1. Access node2 may support RAN info update for RAI set2 and RR set2. When the device moves close to the access node1, the access node1 may provide RAN info update to the device, i.e. RAI set1=−90 dBm and RR set1. On the other hand, when the device moves close to the access node2, the access node2 may provide RAN info update to device, i.e. RAI set2={−90 dBm, 4 dB} and RR set2.

In FIG. 40, set-based RAI configuration/set-based RR configuration/set-based RnR configuration is pre-configured in the access nodes. Access node1 may support RAN info update for RAI set1 and RR set1. Access node2 may support RAN info update for RAI set2 and RR set2. When the device moves close to the access node1, the access node1 may provide RAN info update to the device, i.e. RAI set1=−90 dBm and RR set1. On the other hand, when the device moves close to the access node2, the access node2 may provide RAN info update to device, i.e. RAI set2={−90 dBm, 4 dB} and RR set2.

In an embodiment, the access node may provide only values of a RAI set/RnR set to the device. If the device knows the RAI set/RnR set used by the serving access node, the device can apply the received values to corresponding parameters based on the stored RAI sets/RnR sets. For example, the access node provides device a list or a table to know neighboring access nodes' configuration of supported RAN info.

Figure 41:
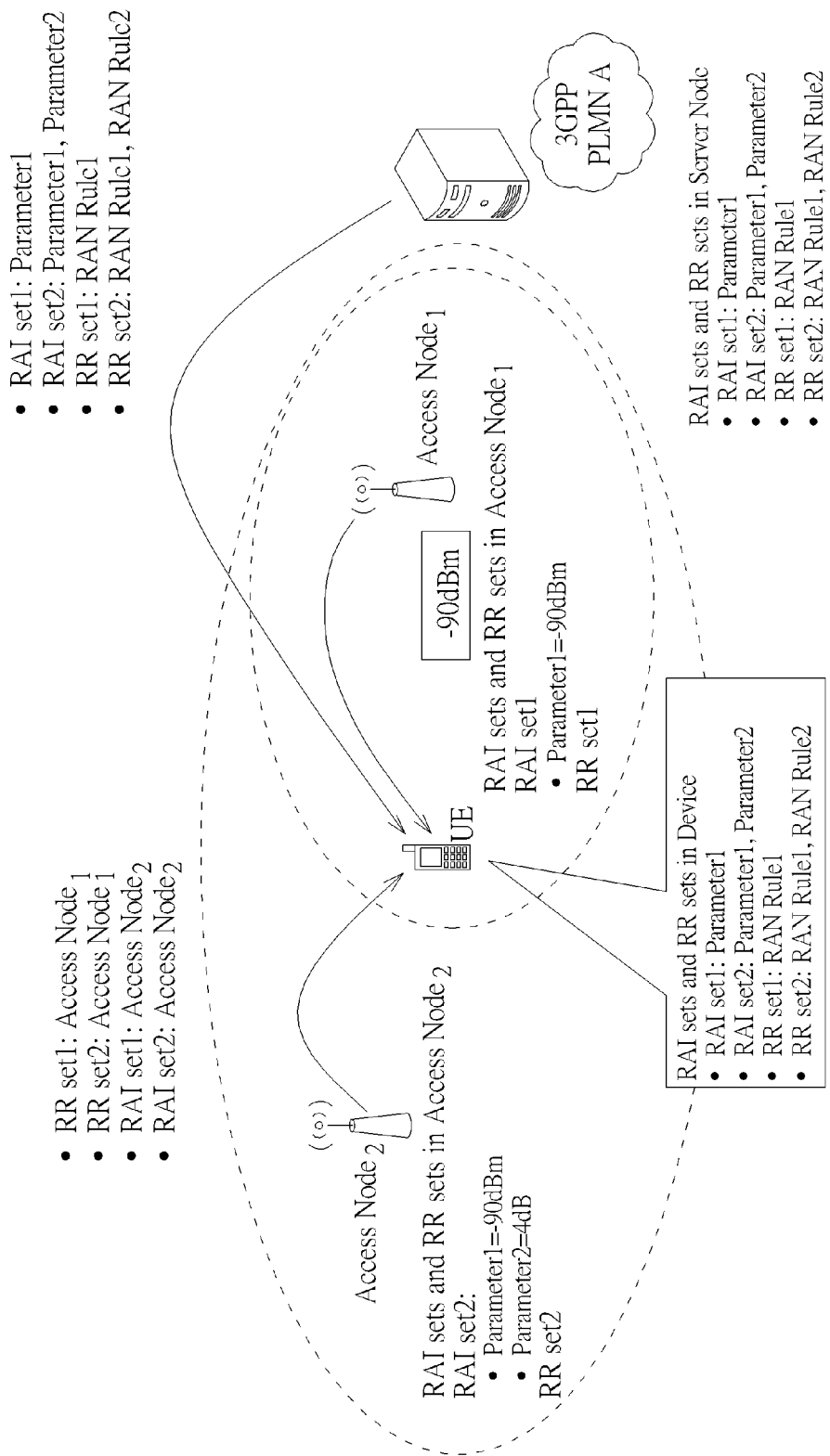
FIGS. 41-42 illustrate an embodiment of RAN info update according to the present disclosure.

For example, in FIG. 41, access node2 provides neighboring access nodes' configuration of supported RAN info, which could be a list or a table. The access node1 supports RR set1 and RAI set1. The access node2 supports RR set2 and RAI set2. The device may store the list or the table. When the device moves close to access node1, the device may use the list or the table to understand the configuration in the access node1, and the access node1 may provide the update value to the device, i.e. −90 dBm. On the other hand, when the device moves close to the access node2, the access node2 may provide the update values to the device, i.e., {−90 dBm, 4 dB}.

Figure 42:
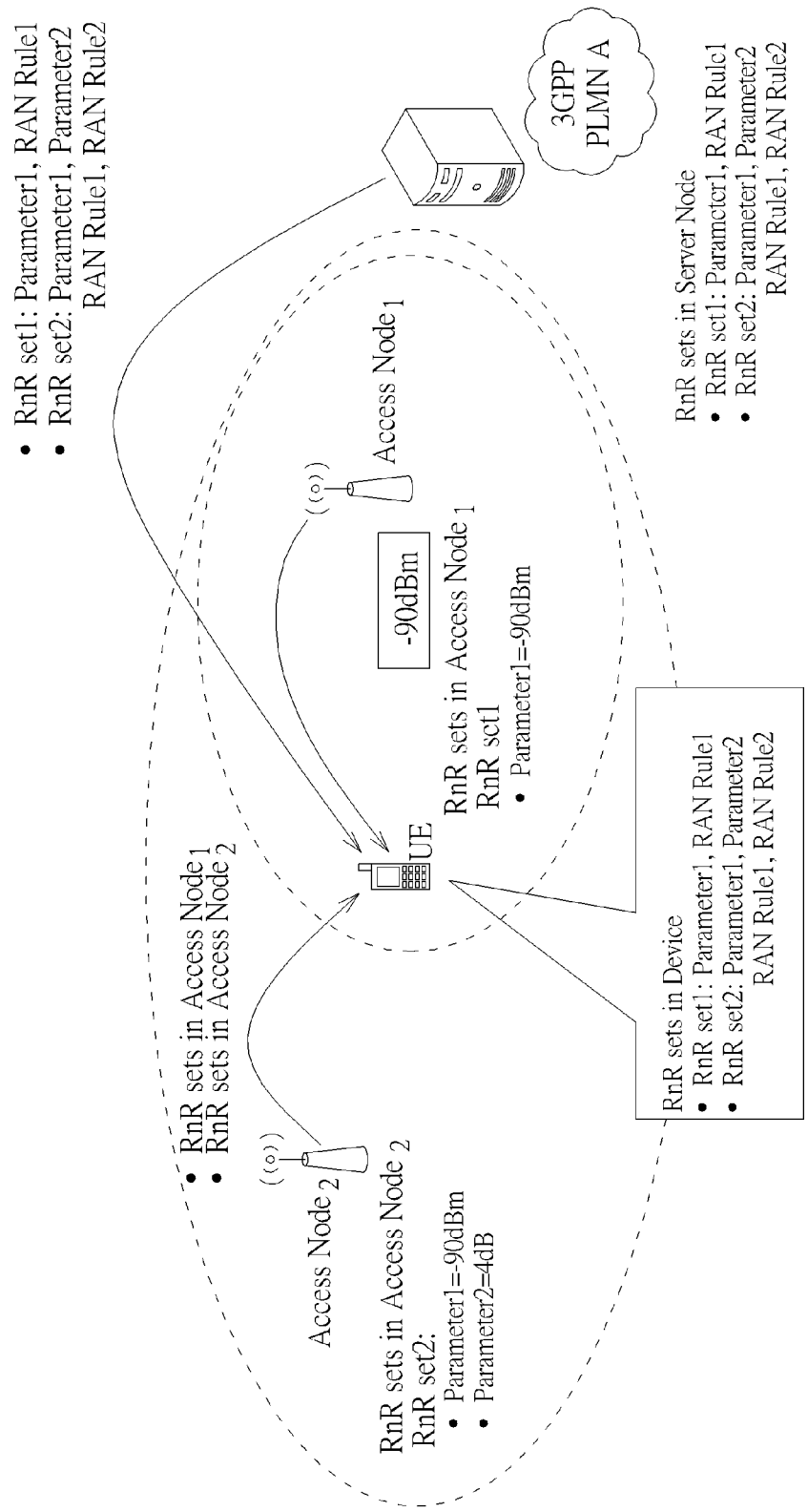

With the same manner, the access nodes may provide the update value to the device, i.e. −90 dBm or {−90 dBm, 4 dB}, in set-based RnR configuration. The detailed can be referred to FIG. 42.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 60.

In conclusion, the present invention addresses to update network detection and selection information and traffic routing information, especially for RAN assistance information and RAN rules. The UE, eNB and MME shall update the RAN assistance information and RAN rules with set-based RAN assistance information and RAN rules in the enhanced signaling/message of access stratum procedure, handover procedure, area update procedure, attach procedure, or cell selection or reselection procedure, so as to reduce data amount for frequent update.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of updating network detection and selection information and traffic routing information for a communication device in a wireless communication system, the method comprising:
   updating network detection and selection information and traffic routing information during a handover procedure, an area update procedure, or an attach procedure;
   wherein updating the network detection and selection information and traffic routing information during the area update procedure comprises:

transmitting a service region change request message to an access node of the wireless communication system, wherein the service region change request message contains a request message to an anchor node of the wireless communication system;

receiving a service region change accept message including the network detection and selection information and traffic routing information from the access node, wherein the service region change accept message includes parameters of RAN assistance information/RAN rules and a response message from the anchor node; and updating the parameters of the RAN assistance information/RAN rules.

2. The method of claim 1, wherein the RAN assistance information includes one or more parameters or one or more values each corresponding to a specific parameter or one or more RAN rules, and the RAN rules are given by the access node by way of access stratum messages and the RAN rules reflect part of access network discovery and selection function (ANDSF) rules obtained from a server node of the wireless communication system.

3. The method of claim 2, further comprising:
storing the RAN rules and RAN assistance information.

4. The method of claim 3, further comprising:
applying the at least a value for the RAN rules and RAN assistance information.

5. The method of claim 1, wherein the RAN assistance information includes one or more parameters or one or more values each corresponding to a specific parameter or one or more RAN rules, and the RAN rules are given by the access node by way of access stratum messages and the RAN rules reflect part of access network discovery and selection function (ANDSF) rules obtained from a server node of the wireless communication system.

6. The method of claim 1, wherein updating the network detection and selection information and traffic routing information during the handover procedure comprises:
during the handover procedure for handover from a source network to a target network of the wireless communication system, receiving a network change command including the network detection and selection information and traffic routing information, from the source network.

7. The method of claim 6, wherein the network change command is a radio resource control (RRC) connection reconfiguration.

8. A method of updating network detection and selection information and traffic routing information for a network in a wireless communication system, the method comprising:
updating network detection and selection information and traffic routing information during a handover procedure, an area update procedure, or an attach procedure;
wherein the updating step comprises:
receiving a service region request message from a communication device of the wireless communication system; and
transmitting a service region change accept message including the network detection and selection information and traffic routing information of the area update procedure, to the communication device, wherein the service region change accept message includes parameters of RAN assistance information/RAN rules.

9. The method of claim 8 wherein the RAN assistance information includes parameters or values each corresponding to a parameter or RAN rules, and the RAN rules are given by the access node by way of access stratum messages and the RAN rules reflect part of access network discovery and selection function (ANDSF) rules obtained from a server node of the wireless communication system.

10. The method of claim 9, wherein the RAN assistance information including parameters that are identified by numbers and values each corresponding to a parameter and zero or more RAN rules that are identified by numbers.

11. The method of claim 8, wherein the RAN assistance information includes parameters or values each corresponding to a parameter or RAN rules, and the RAN rules are given by the access node by way of access stratum messages and the RAN rules reflect part of access network discovery and selection function (ANDSF) rules obtained from a server node of the wireless communication system.

12. A method of updating network detection and selection information and traffic routing information for a communication device in a wireless communication system, the method comprising:
updating network detection and selection information and traffic routing information during a handover procedure, an area update procedure, or an attach procedure;
wherein updating the network detection and selection information and traffic routing information during the attach procedure comprises:
transmitting a contact request message to an access node of the wireless communication system, wherein the contact request message contains a request message to an anchor node of the wireless communication system;
receiving a connection reconfiguration message including the network detection and selection information from the access node, wherein the connection reconfiguration message includes parameters of RAN assistance information/RAN rules and a response message from the anchor node; and
updating the parameters of the RAN assistance information/RAN rules.

13. The method of claim 12, wherein the RAN assistance information includes parameters or values each corresponding to a parameter or RAN rules, and the RAN rules are given by the access node by way of access stratum messages and the RAN rules reflect part of access network discovery and selection function (ANDSF) rules obtained from a server node of the wireless communication system.

14. A method of updating network detection and selection information and traffic routing information for a network in a wireless communication system, the method comprising:
updating network detection and selection information and traffic routing information during a handover procedure, an area update procedure, or an attach procedure;
wherein the updating step comprises:
receiving a contact request message from a communication device of the wireless communication system; and
transmitting a connection reconfiguration message including the network detection and selection information and traffic routing information of the attach procedure, to the communication device, wherein the connection reconfiguration message includes parameters of RAN assistance information/RAN rules.

15. The method of claim 14, wherein the RAN assistance information includes parameters or values each corresponding to a parameter or RAN rules, and the RAN rules are given by the access node by way of access stratum messages and the RAN rules reflect part of access network discovery and selection function (ANDSF) rules obtained from a server node of the wireless communication system.

* * * * *